US011775467B2

(12) United States Patent
Kaushik et al.

(10) Patent No.: US 11,775,467 B2
(45) Date of Patent: Oct. 3, 2023

(54) SYSTEM AND METHOD FOR ORDERING TRANSACTIONS IN SYSTEM-ON-CHIPS

(71) Applicant: NXP USA, Inc., Austin, TX (US)

(72) Inventors: Arvind Kaushik, Nodia (IN); Puneet Khandelwal, Noida (IN)

(73) Assignee: NXP USA, Inc., Austin, TX (US)

( * ) Notice: Subject to any disclaimer, the term of this patent is extended or adjusted under 35 U.S.C. 154(b) by 121 days.

(21) Appl. No.: 17/248,227

(22) Filed: Jan. 14, 2021

(65) Prior Publication Data

US 2022/0222195 A1 Jul. 14, 2022

(51) Int. Cl.
*G06F 13/42* (2006.01)
*G06F 13/20* (2006.01)

(52) U.S. Cl.
CPC ............ *G06F 13/42* (2013.01); *G06F 13/20* (2013.01); *G06F 2213/40* (2013.01)

(58) Field of Classification Search
CPC ................................ G06F 13/42; G06F 13/20
USPC ......................................................... 710/105
See application file for complete search history.

(56) References Cited

U.S. PATENT DOCUMENTS

| | | | | | |
|---|---|---|---|---|---|
| 5,463,745 | A | * | 10/1995 | Vidwans | G06F 9/3857 |
| | | | | | 712/E9.071 |
| 5,584,038 | A | * | 12/1996 | Papworth | G06F 9/3857 |
| | | | | | 712/23 |
| 5,621,896 | A | * | 4/1997 | Burgess | G06F 9/3834 |
| | | | | | 712/E9.046 |
| 5,724,662 | A | * | 3/1998 | Goldberg | H04H 20/67 |
| | | | | | 455/503 |
| 5,878,235 | A | * | 3/1999 | Porterfield | G06F 13/405 |
| | | | | | 710/112 |
| 6,032,158 | A | * | 2/2000 | Mukhopadhyay | G06F 16/23 |
| 6,112,265 | A | * | 8/2000 | Harriman | G06F 3/0674 |
| | | | | | 710/39 |
| 6,185,615 | B1 | * | 2/2001 | Labiaga | H04L 9/40 |
| | | | | | 709/224 |
| 6,345,281 | B1 | * | 2/2002 | Kardos | G06F 11/1461 |
| | | | | | 700/106 |
| 6,526,484 | B1 | * | 2/2003 | Stacovsky | G06F 13/1626 |
| | | | | | 710/39 |
| 6,591,325 | B1 | * | 7/2003 | Akashi | G06F 13/4204 |
| | | | | | 710/305 |
| 6,694,410 | B1 | * | 2/2004 | Dang | G06F 13/405 |
| | | | | | 711/147 |

(Continued)

OTHER PUBLICATIONS

Circular Queue with examples published Oct. 28, 2019 (Year: 2019).*

*Primary Examiner* — Paul R. Myers

(57) ABSTRACT

A transaction ordering system is configured to order various transactions initiated by one device for execution with another device. The transaction ordering system includes ordering circuitry that is configured to generate two pointer values such that one pointer value corresponds to a transaction identifier (ID) of a transaction that is to be processed, and another pointer value corresponds to a transaction ID of a latest initiated transaction. Based on the two pointer values, the ordering circuitry orders the transactions such that if a first transaction is initiated before a second transaction, a set of data packets associated with the first transaction is transmitted to the transaction initiating device before a set of data packets associated with the second transaction is transmitted.

26 Claims, 8 Drawing Sheets

(56) References Cited

U.S. PATENT DOCUMENTS

| | | | |
|---|---|---|---|
| 8,656,078 B2 | 2/2014 | Lim | |
| 8,782,356 B2 | 7/2014 | Panavich et al. | |
| 9,348,775 B2 | 5/2016 | Jandhyam | |
| 9,460,713 B1* | 10/2016 | Moreno Mengibar | ............... G10L 15/07 |
| 9,569,362 B2 | 2/2017 | Sanzone et al. | |
| 10,242,176 B1* | 3/2019 | Sathyanarayana | ...... G06F 13/36 |
| 10,374,981 B1* | 8/2019 | Nicol | ................. H04L 47/6245 |
| 2001/0032282 A1* | 10/2001 | Marietta | ................. G06F 15/17 |
| | | | 710/200 |
| 2002/0031086 A1* | 3/2002 | Welin | ................. H04L 47/6235 |
| | | | 370/428 |
| 2004/0024948 A1* | 2/2004 | Winkler | ................. G06F 13/36 |
| | | | 710/311 |
| 2004/0107240 A1* | 6/2004 | Zabarski | ................ G06F 9/546 |
| | | | 709/201 |
| 2004/0133622 A1* | 7/2004 | Clubb | ................... G06F 9/5077 |
| | | | 709/200 |
| 2004/0225820 A1* | 11/2004 | Adkisson | ............. G06F 13/405 |
| | | | 710/306 |
| 2005/0055489 A1* | 3/2005 | Elliott | .................... G06F 5/065 |
| | | | 710/310 |
| 2008/0276240 A1* | 11/2008 | Ganesh | ............... G06F 13/4239 |
| | | | 718/102 |
| 2009/0083517 A1* | 3/2009 | Riddle | ................... G06F 9/526 |
| | | | 712/30 |
| 2009/0097506 A1* | 4/2009 | Subrahmanyan | ....... H04J 3/062 |
| | | | 370/516 |
| 2009/0216518 A1* | 8/2009 | Errickson | ............... G06F 9/544 |
| | | | 703/23 |
| 2010/0161848 A1* | 6/2010 | Flachs | .................... G06F 13/28 |
| | | | 710/23 |
| 2012/0079148 A1* | 3/2012 | Urzi | .................... G06F 13/1626 |
| | | | 710/107 |
| 2012/0159037 A1* | 6/2012 | Kwon | ................. G06F 13/4022 |
| | | | 710/317 |
| 2013/0246682 A1* | 9/2013 | Jandhyam | ........... G06F 13/1626 |
| | | | 710/310 |
| 2014/0040595 A1* | 2/2014 | Tran | ...................... G06F 9/3857 |
| | | | 712/228 |
| 2014/0195740 A1* | 7/2014 | Saund | .................... G06F 9/466 |
| | | | 711/141 |
| 2015/0234933 A1* | 8/2015 | Grover | ................ G06F 16/2336 |
| | | | 707/800 |
| 2015/0237157 A1* | 8/2015 | Wang | .................... G06F 16/278 |
| | | | 714/4.11 |
| 2015/0296018 A1* | 10/2015 | Dondini | ............. G06F 13/1626 |
| | | | 709/213 |
| 2016/0062941 A1* | 3/2016 | Darbari | .................... G06F 11/28 |
| | | | 710/105 |
| 2016/0139806 A1 | 5/2016 | Sanzone et al. | |
| 2016/0188501 A1* | 6/2016 | Chan | .................... G06F 13/4068 |
| | | | 710/113 |
| 2017/0192720 A1* | 7/2017 | Hong | .................... G06F 13/1626 |
| 2017/0220390 A1* | 8/2017 | Jain | ........................... G06F 9/50 |
| 2018/0095753 A1* | 4/2018 | Bai | ........................ G06F 9/3802 |
| 2019/0220423 A1* | 7/2019 | Makwana | ............ G06F 13/364 |
| 2020/0034214 A1* | 1/2020 | Vanco | ................... G06F 9/5005 |
| 2020/0050548 A1* | 2/2020 | Kotha | ................ G06F 12/0815 |
| 2020/0065016 A1* | 2/2020 | Jiang | ..................... G06F 3/0641 |
| 2020/0403942 A1 | 12/2020 | Kaushik et al. | |
| 2021/0303551 A1* | 9/2021 | Stevens | ................... G06F 9/544 |

\* cited by examiner

| TRANSACTION ID | DEVICE ID | NEXT ID | RECEPTION STATUS BIT |
|---|---|---|---|
| TI1 | D1 | TI2 | 1 |
| TI2 | D1 | TI3 | 1 |
| TI3 | D1 |  | 1 |
| TI4 | D2 | TI5 | 1 |
| TI5 | D2 | TI6 | 0 |
| TI6 | D2 |  | 0 |

FIG. 3

SYSTEM AND METHOD FOR ORDERING TRANSACTIONS IN SYSTEM-ON-CHIPS

BACKGROUND

The present disclosure relates generally to electronic circuits, and, more particularly, to a system and a method for ordering transactions in system-on-chips (SoCs).

In an SoC, a master device initiates various transactions for execution with a slave device. Such transactions may correspond to read transactions for reading associated sets of data packets stored in a memory associated with the slave device. The master device initiates the transactions in a sequential manner with each transaction having a distinct transaction identifier associated therewith. The slave device may however execute the transactions (i.e., read the sets of data packets from the memory), and transmit the sets of data packets to the master device in an out-of-order manner, i.e., in an order that is different than the order in which the transactions are initiated. Typically, to order such transactions (i.e., the sets of data packets), the SoC includes a transaction ordering system that receives the sets of data packets from the slave device in an out-of-order manner, and transmits the sets of data packets to the master device in an order that is same as the order in which the transactions are initiated.

Conventionally, the transaction ordering system includes two counters associated with the master device and a transaction table that stores transaction data associated with various transactions initiated by the master device. One of the counter tracks a number of transactions initiated by the master device and the other counter tracks a number of transactions that are processed (i.e., the sets of data packets that are transmitted to the master device). Further, transaction data of each transaction includes a count of the counter that tracks the number of transactions initiated by the master device when the corresponding transaction is initiated. For each set of data packets, a current count of the other counter is compared with each transaction data of the transaction table, and based on the result of comparison, the corresponding set of data packets is transmitted to the master device, thereby ordering the transactions. The transaction ordering system thus includes various comparison circuits to execute such comparison operations, thereby leading to a significant increase in a size and a manufacturing cost of the transaction ordering system, and in turn, of the SoC. Therefore, there exists a need for a technical solution that solves the aforementioned problems of conventional transaction ordering systems.

SUMMARY

In one embodiment of the present disclosure, a transaction ordering system for ordering a plurality of transactions that are initiated by a first device for executing the plurality of transactions with a second device is disclosed. The transaction ordering system includes ordering circuitry that is coupled with the first and second devices, and configured to generate first and second pointer values associated with the first device such that when a first transaction of the plurality of transactions is initiated, each pointer value of the first and second pointer values is equal to a first transaction identifier (ID) of the first transaction. The ordering circuitry is further configured to update, when a second transaction of the plurality of transactions is initiated after the first transaction, the second pointer value from the first transaction ID to a second transaction ID of the second transaction. Further, the ordering circuitry is configured to receive, from the second device, first and second responses associated with the first and second transactions, respectively. The first and second responses include first and second response IDs and first and second sets of data packets, respectively. The ordering circuitry is further configured to transmit, based on the first and second response IDs and the first and second pointer values, the first and second sets of data packets to the first device such that the second set of data packets is transmitted to the first device after the first set of data packets is transmitted.

In another embodiment of the present disclosure, a system-on-chip (SoC) is disclosed. The SoC includes first and second devices and a transaction ordering system. The first device is configured to initiate a plurality of transactions for executing the plurality of transactions with the second device. The transaction ordering system is coupled with the first and second devices, and configured to order the plurality of transactions. The transaction ordering system includes ordering circuitry that is coupled with the first and second devices, and configured to generate first and second pointer values associated with the first device such that when a first transaction of the plurality of transactions is initiated, each pointer value of the first and second pointer values is equal to a first transaction identifier (ID) of the first transaction. The ordering circuitry is further configured to update, when a second transaction of the plurality of transactions is initiated after the first transaction, the second pointer value from the first transaction ID to a second transaction ID of the second transaction. Further, the ordering circuitry is configured to receive, from the second device, first and second responses associated with the first and second transactions, respectively. The first and second responses include first and second response IDs and first and second sets of data packets, respectively. The ordering circuitry is further configured to transmit, based on the first and second response IDs and the first and second pointer values, the first and second sets of data packets to the first device such that the second set of data packets is transmitted to the first device after the first set of data packets is transmitted.

In yet another embodiment, a method for ordering a plurality of transactions initiated by a first device for execution with a second device is disclosed. The ordering of the plurality of transactions is executed by a transaction ordering system. The method includes generating first and second pointer values associated with the first device such that when a first transaction of the plurality of transactions is initiated, each pointer value of the first and second pointer values is equal to a first transaction identifier (ID) of the first transaction. The method further includes updating the second pointer value from the first transaction ID to a second transaction ID of a second transaction when the second transaction of the plurality of transactions is initiated after the first transaction. Further, the method includes receiving first and second responses associated with the first and second transactions, respectively, from the second device. The first and second responses include first and second response IDs and first and second sets of data packets, respectively. The method further includes transmitting, based on the first and second response IDs and the first and second pointer values, the first and second sets of data packets to the first device such that the second set of data packets is transmitted to the first device after the first set of data packets is transmitted.

In some embodiments, the transaction ordering system further includes a storage circuit that is configured to store a transaction table that includes a plurality of entries associated with the plurality of transactions, respectively. First and second transaction data associated with the first and second transactions are stored in first and second entries of the plurality of entries, respectively. The first and second transaction IDs correspond to first and second entry addresses of the first and second entries, respectively. The first transaction data includes the first and second transaction IDs and a device ID of the first device. The second transaction ID in the first transaction data indicates that the second transaction is initiated after the first transaction.

In some embodiments, when the first set of data packets is transmitted to the first device, the ordering circuitry is further configured to extract the second transaction ID from the first transaction data. The ordering circuitry is further configured to update the first pointer value from the first transaction ID to the second transaction ID.

In some embodiments, the second transaction data includes the second transaction ID, the device ID of the first device, and a third transaction ID of a third transaction of the plurality of transactions that is initiated after the second transaction.

In some embodiments, the ordering circuitry includes a processing circuit that is coupled with the storage circuit and the first device. When the first transaction is initiated, the processing circuit is configured to receive, from the first device, the first transaction ID and the device ID of the first device. The processing circuit is further configured to store the first transaction ID and the device ID in the first entry of the transaction table, and generate the first and second pointer values such that each pointer value of the first and second pointer values is equal to the first transaction ID. When the second transaction is initiated, the processing circuit is further configured to receive, from the first device, the second transaction ID and the device ID of the first device. Further, the processing circuit is configured to store the second transaction ID in the first and second entries of the transaction table and the device ID in the second entry of the transaction table, and update the second pointer value from the first transaction ID to the second transaction ID.

In some embodiments, the ordering circuitry includes a buffer memory, a processing circuit, and a response control circuit that is coupled with the second device, the processing circuit, and the buffer memory. The response control circuit is configured to receive the first and second responses from the second device. The response control circuit is further configured to store the first and second sets of data packets in the buffer memory, and transmit the first and second response IDs to the processing circuit.

In some embodiments, the processing circuit is coupled with the storage circuit, and configured to generate first and second reception status bits such that the first and second reception status bits are activated when the first and second response IDs are received by the processing circuit, respectively. The processing circuit is further configured to determine whether the first and second response IDs match the first and second transaction IDs, respectively. When the first and second response IDs match the first and second transaction IDs, the processing circuit is further configured to store the first and second reception status bits in the first and second entries of the transaction table, respectively.

In some embodiments, the ordering circuitry further includes a first-in-first-out (FIFO) memory and a FIFO control circuit that is coupled with the FIFO memory, the buffer memory, and the processing circuit. The FIFO control circuit is configured to receive the first response ID from the processing circuit when the first reception status bit associated with the first pointer value is activated, and store the first response ID in the FIFO memory. Further, the FIFO control circuit is configured to retrieve the first response ID from the FIFO memory when the first response ID is at a first location of the FIFO memory.

In some embodiments, the processing circuit is further configured to determine whether the first reception status bit associated with the first pointer value is activated, and transmit the first response ID to the FIFO control circuit when the first reception status bit associated with the first pointer value is activated.

In some embodiments, the FIFO control circuit is further configured to determine whether a count associated with the first device is less than a threshold value, and re-store the first response ID in the FIFO memory when the count associated with the first device is equal to the threshold value.

In some embodiments, the FIFO control circuit is further configured to determine whether a count associated with the first device is less than a threshold value. Further, the FIFO control circuit is configured to generate, when the count associated with the first device is less than the threshold value, first transmission status data based on the first response ID, and transmit the first transmission status data to the buffer memory. The buffer memory is configured to transmit, based on the first transmission status data, the first set of data packets to the first device.

In some embodiments, the ordering circuitry further includes a counter that is coupled with the FIFO control circuit, and configured to generate and transmit the count associated with the first device to the FIFO control circuit. The count is incremented when the first set of data packets is transmitted to the first device.

In some embodiments, the processing circuit is further configured to extract, when the first set of data packets is transmitted to the first device, the second transaction ID from the first transaction data. Further, the processing circuit is configured to update the first pointer value from the first transaction ID to the second transaction ID. The processing circuit is further configured to determine whether the second reception status bit associated with the first pointer value is activated. When the second reception status bit associated with the first pointer value is activated, the processing circuit is further configured to transmit the second response ID to the FIFO control circuit to facilitate transmission of the second set of data packets to the first device.

Various embodiments of the present disclosure disclose a transaction ordering system for ordering multiple transactions initiated by a first device for execution with a second device. The transaction ordering system includes ordering circuitry that is coupled with the first and second devices, and configured to generate first and second pointer values associated with the first device such that when a first transaction is initiated by the first device, each pointer value of the first and second pointer values is equal to a first transaction identifier (ID) of the first transaction. The ordering circuitry is further configured to update, when a second transaction is initiated by the first device after the first transaction, the second pointer value from the first transaction ID to a second transaction ID of the second transaction. Further, the ordering circuitry is configured to receive from the second device, first and second responses that include first and second response IDs and first and second sets of data packets, respectively. The ordering circuitry is further configured to transmit the first and second sets of data packets to the first device based on the first and second response IDs and the first and second pointer values. The first and second sets of data packets are transmitted to the first device such that the second set of data packets is transmitted to the first device after the first set of data packets is transmitted.

Thus, in the transaction ordering system of the present disclosure, entry addresses of the transaction table are utilized as transaction IDs of various transactions. Further, each transaction data includes a transaction ID of a transaction that is to be subsequently processed. As a result, a need to implement various comparison circuits in the transaction ordering system of the present disclosure to order various transactions is eliminated. Consequently, a size and a manufacturing cost of the transaction ordering system of the present disclosure are significantly less than that of a conventional transaction ordering system that utilizes counters for ordering transactions and implements various comparison circuits. Thus, a size and a manufacturing cost of a system-on-chip (SoC) that includes the transaction ordering system of the present disclosure are significantly less than that of an SoC that includes the conventional transaction ordering system.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIG. 3 is a tabular diagram that illustrates a transaction table of the SoC of FIG. 1 in accordance with an embodiment of the present disclosure.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
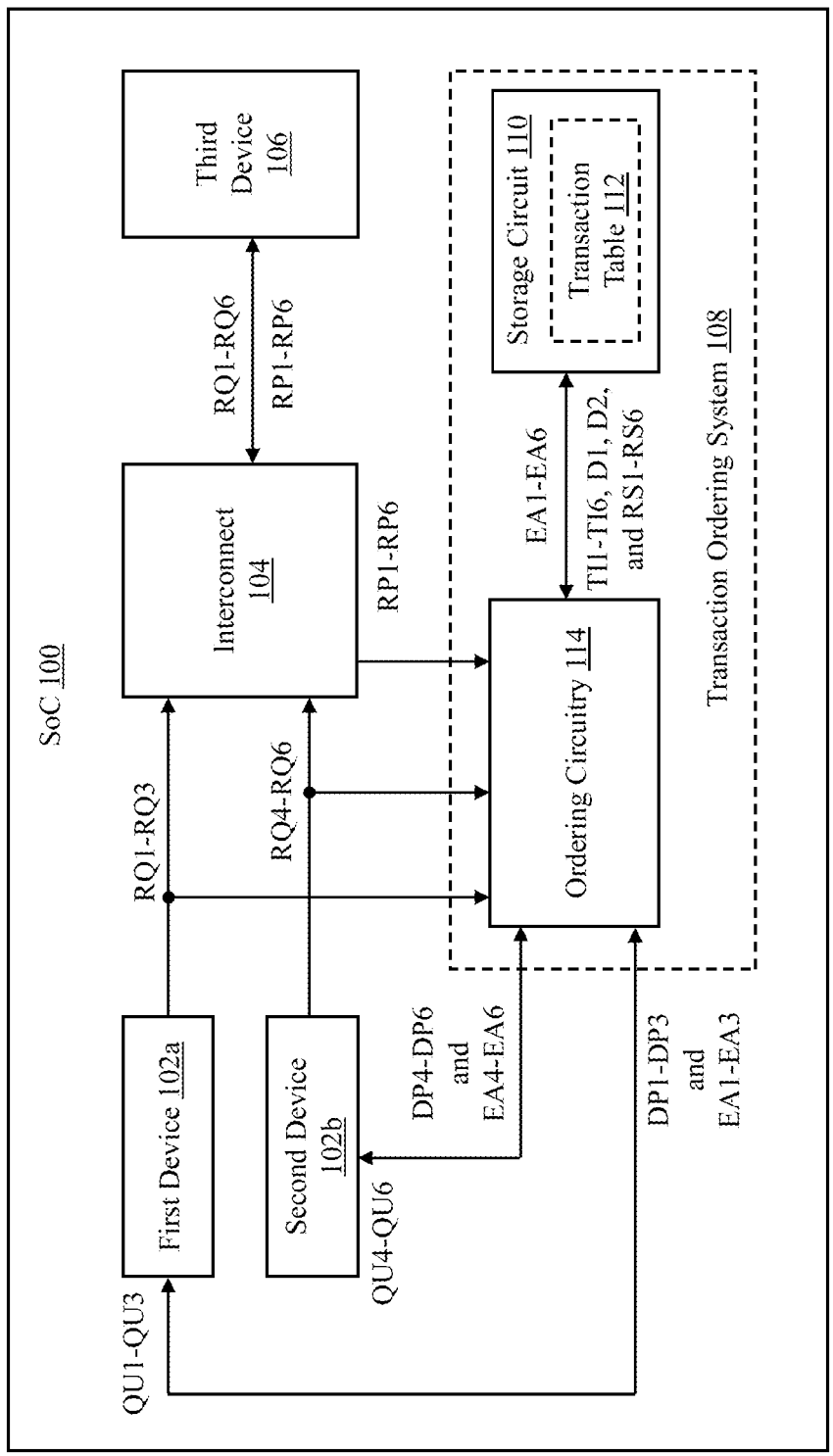
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 includes first and second devices 102a and 102b, an interconnect 104, a third device 106, and a transaction ordering system 108. The transaction ordering system 108 includes a storage circuit 110 that is configured to store a transaction table 112, and ordering circuitry 114. In an embodiment, the first and second devices 102a and 102b correspond to Advanced eXtensible Interface (AXI) master devices (e.g., a direct-memory-access controller, a processor, or the like), and the third device 106 corresponds to an AXI slave device (e.g., a memory system, a packet classifier, or the like). The SoC 100 may be included in data-intensive applications such as convolutional neural networking systems, advanced driver-assistance systems, wired/wireless networking systems, or the like.

It will be apparent to a person skilled in the art that the SoC 100 is shown to include two AXI master devices (i.e., the first and second devices 102a and 102b) and one AXI slave device (i.e., the third device 106) to make the illustrations concise and clear and should not be considered as a limitation of the present disclosure. In various other embodiments, the SoC 100 may include more than one AXI slave device, and more than two AXI master devices communicating with each AXI slave device, without deviating from the scope of the present disclosure.

The first and second devices 102a and 102b are coupled with the interconnect 104 and the ordering circuitry 114. The first and second devices 102a and 102b may include suitable logic, circuitry, interfaces, and/or code, executable by the circuitry, that may be configured to perform one or more operations. For example, the first and second devices 102a and 102b are configured to initiate various transactions for execution with the third device 106. For the sake of ongoing discussion, it is assumed that the first device 102a is configured to initiate first through third transactions (collectively referred to as a "first plurality of transactions") for executing the first through third transactions with the third device 106. Similarly, the second device 102b is configured to initiate fourth through sixth transactions (collectively referred to as a "second plurality of transactions") for executing the first through third transactions with the third device 106. The first device 102a initiates the first through third transactions in a sequential manner, and the second device 102b initiates the fourth through sixth transactions in a sequential manner. In one example, the first through sixth transactions correspond to read transactions for reading first through sixth sets of data packets DP1-DP6 stored in a memory (not shown) associated with the third device 106, respectively.

Prior to initiating the transactions, the first and second devices 102a and 102b are configured to generate and transmit various queries to the ordering circuitry 114 to retrieve entry addresses of available entries of the transaction table 112. Further, the first and second devices 102a and 102b initiate the transactions such that the retrieved entry addresses are transaction identifiers (IDs) of the corresponding transactions. For example, prior to initiating the first transaction, the first device 102a is further configured to generate and transmit a first query QU1 to the ordering circuitry 114, and receive, from the ordering circuitry 114 in response to the first query QU1, a first entry address EA1 of a first entry (shown later in FIG. 3) of the transaction table 112. The first device 102a initiates the first transaction such that the first entry address EA1 is a first transaction ID TI1 of the first transaction.

Prior to initiating the second and third transactions, the first device 102a is similarly configured to generate and transmit second and third queries QU2 and QU3 to the ordering circuitry 114, respectively. In response to the second and third queries QU2 and QU3, the first device 102a is further configured to receive second and third entry addresses EA2 and EA3 of second and third entries (shown later in FIG. 3) of the transaction table 112 from the ordering circuitry 114, respectively. The first device 102a initiates the second and third transactions such that the second and third entry addresses EA2 and EA3 are second and third transaction IDs TI2 and TI3 of the second and third transactions, respectively. Similarly, prior to initiating the fourth through sixth transactions, the second device 102b is further configured to generate and transmit fourth through sixth queries QU4-QU6 to the ordering circuitry 114, respectively. In response to the fourth through sixth queries QU4-QU6, the second device 102b is further configured to receive fourth through sixth entry addresses EA4-EA6 of fourth through sixth entries (shown later in FIG. 3) of the transaction table 112 from the ordering circuitry 114, respectively. The second device 102b initiates the fourth through sixth transactions such that the fourth through sixth entry addresses EA4-EA6 are fourth through sixth transaction IDs TI4-TI6 of the fourth through sixth transactions, respectively.

The first device 102a is further configured to generate, based on the initiation of the first through third transactions, first through third requests RQ1-RQ3, respectively. Similarly, the second device 102b is further configured to generate, based on the initiation of the fourth through sixth transactions, fourth through sixth requests RQ4-RQ6, respectively. The first through sixth requests RQ1-RQ6 include the first through sixth transaction IDs TI1-TI6 and first through sixth read addresses (not shown) associated with the first through sixth sets of data packets DP1-DP6, respectively. The first through sixth read addresses correspond to addresses of initial data packets of the first through sixth sets of data packets DP1-DP6, respectively. Each request of the first through sixth requests RQ1-RQ6 further includes a device ID of a device initiating the corresponding transaction. Thus, each request of the first through third requests RQ1-RQ3 further includes a first device ID D1 of the first device 102a, and each request of the fourth through sixth requests RQ4-RQ6 further includes a second device ID D2 of the second device 102b.

It will be apparent to a person skilled in the art that each request of the first through sixth requests RQ1-RQ6 is shown to include a transaction ID, a device ID, and a read address to make the illustrations concise and clear and should not be considered as a limitation of the present disclosure. In various other embodiments, the first through sixth requests RQ1-RQ6 may further include other data associated with the first through sixth transactions such as first through sixth burst lengths (not shown) and first through sixth burst sizes (not shown) of the first through sixth sets of data packets DP1-DP6, respectively, without deviating from the scope of the present disclosure. The first through sixth burst lengths correspond to a number of data packets in the first through sixth sets of data packets DP1-DP6, respectively, and the first through sixth burst sizes correspond to a number of data bytes in each data packet of the first through sixth sets of data packets DP1-DP6, respectively.

The first and second devices 102a and 102b are further configured to transmit the first through sixth requests RQ1-RQ6 to the interconnect 104 and the ordering circuitry 114. In response to the first through third requests RQ1-RQ3, the first device 102a is further configured to receive the first through third sets of data packets DP1-DP3 from the ordering circuitry 114, respectively. The first through third sets of data packets DP1-DP3 are received in a sequential manner (i.e., in an order that is similar to an order in which the first through third transactions are initiated). The first device 102a may further be configured to execute various functional operations associated therewith based on the received first through third sets of data packets DP1-DP3. Similarly, in response to the fourth through sixth requests RQ4-RQ6, the second device 102b is further configured to receive the fourth through sixth sets of data packets DP4-DP6 from the ordering circuitry 114, respectively. The fourth through sixth sets of data packets DP4-DP6 are received in a sequential manner (i.e., in an order that is similar to an order in which the fourth through sixth transactions are initiated). The second device 102b may further be configured to execute various functional operations associated therewith based on the received fourth through sixth sets of data packets DP4-DP6.

The interconnect 104 is coupled with the first and second devices 102a and 102b, the third device 106, and the transaction ordering system 108 (i.e., the ordering circuitry 114). The interconnect 104 may include suitable logic, circuitry, interfaces, and/or code, executable by the circuitry, that may be configured to perform one or more operations. For example, the interconnect 104 is configured to receive the first through third requests RQ1-RQ3 sequentially from the first device 102a, and transmit the first through third requests RQ1-RQ3 to the third device 106 in a sequential manner. In response to the first through third requests RQ1-RQ3, the interconnect 104 is further configured to receive first through third responses RP1-RP3 associated with the first through third transactions from the third device 106, respectively. The first through third responses RP1-RP3 include first through third response IDs (shown later in FIG. 2) and the first through third sets of data packets DP1-DP3, respectively. The interconnect 104 may receive the first through third responses RP1-RP3 in one of a sequential manner and an out-of-order manner (i.e., in an order that is different than the order in which the first through third transactions are initiated). The interconnect 104 is further configured to transmit the first through third responses RP1-RP3 to the ordering circuitry 114.

The interconnect 104 is further configured to receive the fourth through sixth requests RQ4-RQ6 sequentially from the second device 102b, and transmit the fourth through sixth requests RQ4-RQ6 to the third device 106 in a sequential manner. In response to the fourth through sixth requests RQ4-RQ6, the interconnect 104 is further configured to receive fourth through sixth responses RP4-RP6 associated with the fourth through sixth transactions from the third device 106, respectively. The fourth through sixth responses RP4-RP6 include fourth through sixth response IDs (shown later in FIG. 2) and the fourth through sixth sets of data packets DP4-DP6, respectively. The interconnect 104 may receive the fourth through sixth responses RP4-RP6 in one of a sequential manner and an out-of-order manner (i.e., in an order that is different than the order in which the fourth through sixth transactions are initiated). The interconnect 104 is further configured to transmit the fourth through sixth responses RP4-RP6 to the ordering circuitry 114. In one example, the interconnect 104 communicates with the first and second devices 102a and 102b, the third device 106, and the ordering circuitry 114 of the transaction ordering system 108 in accordance with an AXI protocol.

The third device 106 may correspond to a memory system that includes the memory and a memory controller (not shown). The memory controller of the third device 106 is coupled with the memory and the interconnect 104, and configured to receive the first through third requests RQ1-RQ3 from the interconnect 104. Based on the first through third requests RQ1-RQ3, the memory controller is further configured to execute the first through third transactions on the memory, respectively. As the first through third transactions correspond to read transactions, the execution of the first through third transactions correspond to reading of the first through third sets of data packets DP1-DP3 stored in the memory, respectively. Based on the execution of the first through third transactions, the memory controller is further configured to generate the first through third responses RP1-RP3 such that the first through third responses RP1-

RP3 include the first through third response IDs and the first through third sets of data packets DP1-DP3, respectively. In such a scenario, the first through third response IDs are same as the first through third transaction IDs TI1-TI3 of the first through third transactions, respectively. The memory controller is further configured to transmit the first through third responses RP1-RP3 to the interconnect 104. The memory controller executes the first through third transactions and generates and transmits the first through third responses RP1-RP3 to the interconnect 104 in one of a sequential manner and an out-of-order manner.

The memory controller of the third device 106 is further configured to receive the fourth through sixth requests RQ4-RQ6 from the interconnect 104, and execute the fourth through sixth transactions on the memory based on the fourth through sixth requests RQ4-RQ6, respectively. Based on the execution of the fourth through sixth transactions, the memory controller is further configured to generate the fourth through sixth responses RP4-RP6 such that the fourth through sixth responses RP4-RP6 include the fourth through sixth response IDs and the fourth through sixth sets of data packets DP4-DP6, respectively. In such a scenario, the fourth through sixth response IDs are same as the fourth through sixth transaction IDs TI4-TI6 of the fourth through sixth transactions, respectively. The memory controller is further configured to transmit the fourth through sixth responses RP4-RP6 to the interconnect 104. The memory controller executes the fourth through sixth transactions and generates and transmits the fourth through sixth responses RP4-RP6 to the interconnect 104 in one of a sequential manner and an out-of-order manner.

The transaction ordering system 108 is coupled with the first and second devices 102a and 102b and the interconnect 104. The transaction ordering system 108 is further coupled with the third device 106 by way of the interconnect 104. When the first through third transactions are initiated by the first device 102a, the transaction ordering system 108 is configured to receive the first through third requests RQ1-RQ3 from the first device 102a, respectively. Similarly, when the fourth through sixth transactions are initiated by the second device 102b, the transaction ordering system 108 is further configured to receive the fourth through sixth requests RQ4-RQ6 from the second device 102b, respectively.

The transaction ordering system 108 is further configured to receive the first through sixth responses RP1-RP6 from the interconnect 104. For the sake of ongoing discussion, it is assumed that the first through third responses RP1-RP3 are received in an out-of-order manner, and the fourth through sixth responses RP4-RP6 are received in an out-of-order manner. In such a scenario, the transaction ordering system 108 is configured to order the first through third transactions by sequentially transmitting, based on the first through third requests RQ1-RQ3, the first through third sets of data packets DP1-DP3 to the first device 102a. Similarly, the transaction ordering system 108 is further configured to order the fourth through sixth transactions by sequentially transmitting, based on the fourth through sixth requests RQ4-RQ6, the fourth through sixth sets of data packets DP4-DP6 to the second device 102b. To facilitate the ordering of various transactions initiated by the first and second devices 102a and 102b (i.e., the first through third transactions and the fourth through sixth transactions), the transaction ordering system 108 includes the storage circuit 110 and the ordering circuitry 114.

The storage circuit 110 includes a set of flip-flops (not shown) that is configured to store the transaction table 112.

The transaction table 112 includes a plurality of entries having a plurality of entry addresses associated therewith. Each entry of the transaction table 112 stores transaction data associated with one transaction. Further, transaction IDs of various transactions initiated by AXI master devices (such as the first and second devices 102a and 102b) correspond to entry addresses of the transaction table 112 where the corresponding transaction data is to be stored (i.e., entry addresses of available entries in the transaction table 112). For the sake of ongoing discussion, it is assumed that first through sixth transaction data (not shown) associated with the first through sixth transactions are stored in the first through sixth entries of the transaction table 112. Hence, the first through sixth transaction IDs TI1-TI6 of the first through sixth transactions correspond to the first through sixth entry addresses EA1-EA6 of the first through sixth entries, respectively. The transaction table 112 is explained in detail in conjunction with FIG. 3.

The ordering circuitry 114 is coupled with the storage circuit 110, the first and second devices 102a and 102b, and the interconnect 104. The ordering circuitry 114 is further coupled with the third device 106 by way of the interconnect 104. Prior to the initiation of the first through third transactions, the ordering circuitry 114 is configured to receive the first through third queries QU1-QU3 from the first device 102a, respectively. Similarly, prior to the initiation of the fourth through sixth transactions, the ordering circuitry 114 is further configured to receive the fourth through sixth queries QU4-QU6 from the second device 102b, respectively. Based on each received query, the ordering circuitry 114 is further configured to identify an entry address of an available entry of the transaction table 112. For example, based on the first through sixth queries QU1-QU6, the ordering circuitry 114 is further configured to identify the first through sixth entry addresses EA1-EA6 of the first through sixth entries that are available in the transaction table 112 when the first through sixth queries QU1-QU6 are received, respectively. The ordering circuitry 114 is further configured to transmit, to the first and second devices 102a and 102b, the first through sixth entry addresses EA1-EA6 as responses to the first through sixth queries QU1-QU6, respectively. Further, the first through sixth transactions are initiated such that the first through sixth entry addresses EA1-EA6 are the first through sixth transaction IDs TI1-TI6 of the first through sixth transactions, respectively.

When the first device 102a initiates the first through third transactions, the ordering circuitry 114 is configured to receive the first through third requests RQ1-RQ3 from the first device 102a, respectively. Similarly, when the second device 102b initiates the fourth through sixth transactions, the ordering circuitry 114 is further configured to receive the fourth through sixth requests RQ4-RQ6 from the second device 102b, respectively.

When the first request RQ1 is received (i.e., when the first transaction is initiated), the ordering circuitry 114 is further configured to store the first transaction ID TI1 and the first device ID D1 in the first entry of the transaction table 112 (i.e., an entry having an entry address that is same as the first transaction ID TI1). The ordering circuitry 114 is further configured to generate first and second pointer values (not shown) associated with the first device 102a such that each pointer value of the first and second pointer values is equal to the first transaction ID TI1. In an embodiment, the ordering circuitry 114 may include first and second registers (not shown), and the first and second pointer values may correspond to data stored in the first and second registers, respectively. The first pointer value is indicative of a transaction ID of a transaction that is to be processed (i.e., a set of data packets that is to be transmitted to the first device 102a), and the second pointer value is indicative of a transaction ID of a latest transaction that is initiated by the first device 102a.

When the second request RQ2 is received (i.e., when the second transaction is initiated), the ordering circuitry 114 is further configured to store the second transaction ID TI2 and the first device ID D1 in the second entry of the transaction table 112 (i.e., an entry having an entry address that is same as the second transaction ID TI2). The ordering circuitry 114 is further configured to store the second transaction ID TI2 in the first entry of the transaction table 112 (i.e., an entry having an entry address that is same as the second pointer value) to indicate that the second transaction is initiated after the first transaction, and hence, is to be processed after the first transaction. The first and second transaction IDs TI1 and TI2 and the first device ID D1 constitute the first transaction data associated with the first transaction. In other words, the first transaction data includes the first and second transaction IDs TI1 and TI2 and the first device ID D1. The ordering circuitry 114 is further configured to update the second pointer value from the first transaction ID TI1 to the second transaction ID TI2.

When the third request RQ3 is received (i.e., when the third transaction is initiated), the ordering circuitry 114 is further configured to store the third transaction ID TI3 and the first device ID D1 in the third entry of the transaction table 112 (i.e., an entry having an entry address that is same as the third transaction ID TI3). The ordering circuitry 114 is further configured to store the third transaction ID TI3 in the second entry of the transaction table 112 (i.e., an entry having an entry address that is same as the second pointer value) to indicate that the third transaction is initiated after the second transaction, and hence, is to be processed after the second transaction. The second transaction data associated with the second transaction thus includes the second and third transaction IDs TI2 and TI3 and the first device ID D1. The ordering circuitry 114 is further configured to update the second pointer value from the second transaction ID TI2 to the third transaction ID TI3. It will be apparent to a person skilled in the art that the third transaction data associated with the third transaction includes the third transaction ID TI3 and the first device ID D1, and may further include a seventh transaction ID (not shown) of a seventh transaction that is initiated by the first device 102a after the third transaction. In such a scenario, the second pointer value may be updated from the third transaction ID TI3 to the seventh transaction ID of the seventh transaction.

When the fourth request RQ4 is received (i.e., when the fourth transaction is initiated), the ordering circuitry 114 is further configured to store the fourth transaction ID TI4 and the second device ID D2 in the fourth entry of the transaction table 112 (i.e., an entry having an entry address that is same as the fourth transaction ID TI4). The ordering circuitry 114 is further configured to generate third and fourth pointer values (not shown) associated with the second device 102b such that each pointer value of the third and fourth pointer values is equal to the fourth transaction ID TI4. In an embodiment, the ordering circuitry 114 may include third and fourth registers (not shown), and the third and fourth pointer values may correspond to data stored in the third and fourth registers, respectively. The third pointer value is indicative of a transaction ID of a transaction that is to be processed (i.e., a set of data packets that is to be transmitted to the second device 102b), and the fourth pointer value is indicative of a transaction ID of a latest transaction that is initiated by the second device 102b.

When the fifth request RQ5 is received (i.e., when the fifth transaction is initiated), the ordering circuitry 114 is further configured to store the fifth transaction ID TI5 and the second device ID D2 in the fifth entry of the transaction table 112. The ordering circuitry 114 is further configured to store the fifth transaction ID TI5 in the fourth entry of the transaction table 112 (i.e., an entry having an entry address that is same as the fourth pointer value) to indicate that the fifth transaction is initiated after the fourth transaction, and hence, is to be processed after the fourth transaction. The fourth transaction data associated with the fourth transaction thus includes the fourth and fifth transaction IDs TI4 and TI5 and the second device ID D2. The ordering circuitry 114 is further configured to update the fourth pointer value from the fourth transaction ID TI4 to the fifth transaction ID TI5.

When the sixth request RQ6 is received (i.e., when the sixth transaction is initiated), the ordering circuitry 114 is further configured to store the sixth transaction ID TI6 and the second device ID D2 in the sixth entry of the transaction table 112. The ordering circuitry 114 is further configured to store the sixth transaction ID TI6 in the fifth entry of the transaction table 112 (i.e., an entry having an entry address that is same as the fourth pointer value) to indicate that the sixth transaction is initiated after the fifth transaction, and hence, is to be processed after the fifth transaction. The fifth transaction data associated with the fifth transaction thus includes the fifth and sixth transaction IDs TI5 and TI6 and the second device ID D2. The ordering circuitry 114 is further configured to update the fourth pointer value from the fifth transaction ID TI5 to the sixth transaction ID TI6. It will be apparent to a person skilled in the art that the sixth transaction data associated with the sixth transaction includes the sixth transaction ID TI6 and the second device ID D2, and may further include an eighth transaction ID of an eighth transaction that is initiated by the second device 102b after the sixth transaction. In such a scenario, the fourth pointer value may be updated from the sixth transaction ID TI6 to the eighth transaction ID of the eighth transaction.

The ordering circuitry 114 is further coupled with the interconnect 104, and configured to receive the first through sixth responses RP1-RP6, and generate first through sixth reception status bits RS1-RS6 such that the first through sixth reception status bits RS1-RS6 are activated (i.e., are set to "1") when the first through sixth responses RP1-RP6 are received by the ordering circuitry 114, respectively. The ordering circuitry 114 is further configured to determine whether the first through sixth response IDs match the first through sixth transaction IDs TI1-TI6, respectively. Further, the ordering circuitry 114 is configured to store, when the first through sixth response IDs match the first through sixth transaction IDs TI1-TI6, the first through sixth reception status bits RS1-RS6 in the first through sixth entries of the transaction table 112, respectively. The first through sixth transaction data thus further include the first through sixth reception status bits RS1-RS6, respectively. For the sake of ongoing discussion, it is assumed that the first through third responses RP1-RP3 are received in an out-of-order manner, and the fourth through sixth responses RP4-RP6 are received in an out-of-order manner.

The ordering circuitry 114 is further configured to determine whether the reception status bit associated with one of the first and third pointer values is activated. When the reception status bit associated with the first pointer value is activated, the ordering circuitry 114 is further configured to transmit, to the first device 102a, a set of data packets associated with a response ID that is same as the first pointer value. Similarly, when the reception status bit associated with the third pointer value is activated, the ordering circuitry 114 is further configured to transmit, to the second device 102b, a set of data packets associated with a response ID that is same as the third pointer value. As the first and third pointer values are equal to the first and fourth transaction IDs TI1 and TI4, the ordering circuitry 114 is further configured to transmit the first and fourth sets of data packets DP1 and DP4 to the first and second devices 102a and 102b when the first and fourth reception status bit RS1 and RS4 are activated, respectively.

The ordering circuitry 114 is further configured to extract, after the first and fourth sets of data packets DP1 and DP4 are transmitted to the first and second devices 102a and 102b, the second and fifth transaction IDs TI2 and TI5 stored in the first and fourth transaction data, respectively. The ordering circuitry 114 is further configured to update the first pointer value from the first transaction ID TI1 to the second transaction ID TI2 to indicate that the second set of data packets DP2 is to be transmitted to the first device 102a. Similarly, the ordering circuitry 114 is further configured to update the third pointer value from the fourth transaction ID TI4 to the fifth transaction ID TI5 to indicate that the fifth set of data packets DP5 is to be transmitted to the second device 102b. It will be apparent to a person skilled in the art that the ordering circuitry 114 may similarly update the first and third pointer values to facilitate the transmission of the third and sixth sets of data packets DP3 and DP6 to the first and second devices 102a and 102b, respectively. The ordering circuitry 114 thus orders the first through third transactions and the fourth through sixth transactions. The ordering circuitry 114 is explained in detail in conjunction with FIG. 2.

It will be apparent to a person skilled in the art that the first and second devices 102a and 102b are shown to initiate three transactions each to make the illustrations concise and clear and should not be considered as a limitation of the present disclosure. In various other embodiments, the first and second devices 102a and 102b may initiate more than three transactions, without deviating from the scope of the present disclosure. In such a scenario, the ordering circuitry 114 orders the initiated transactions in a similar manner as described above.

Figure 2:
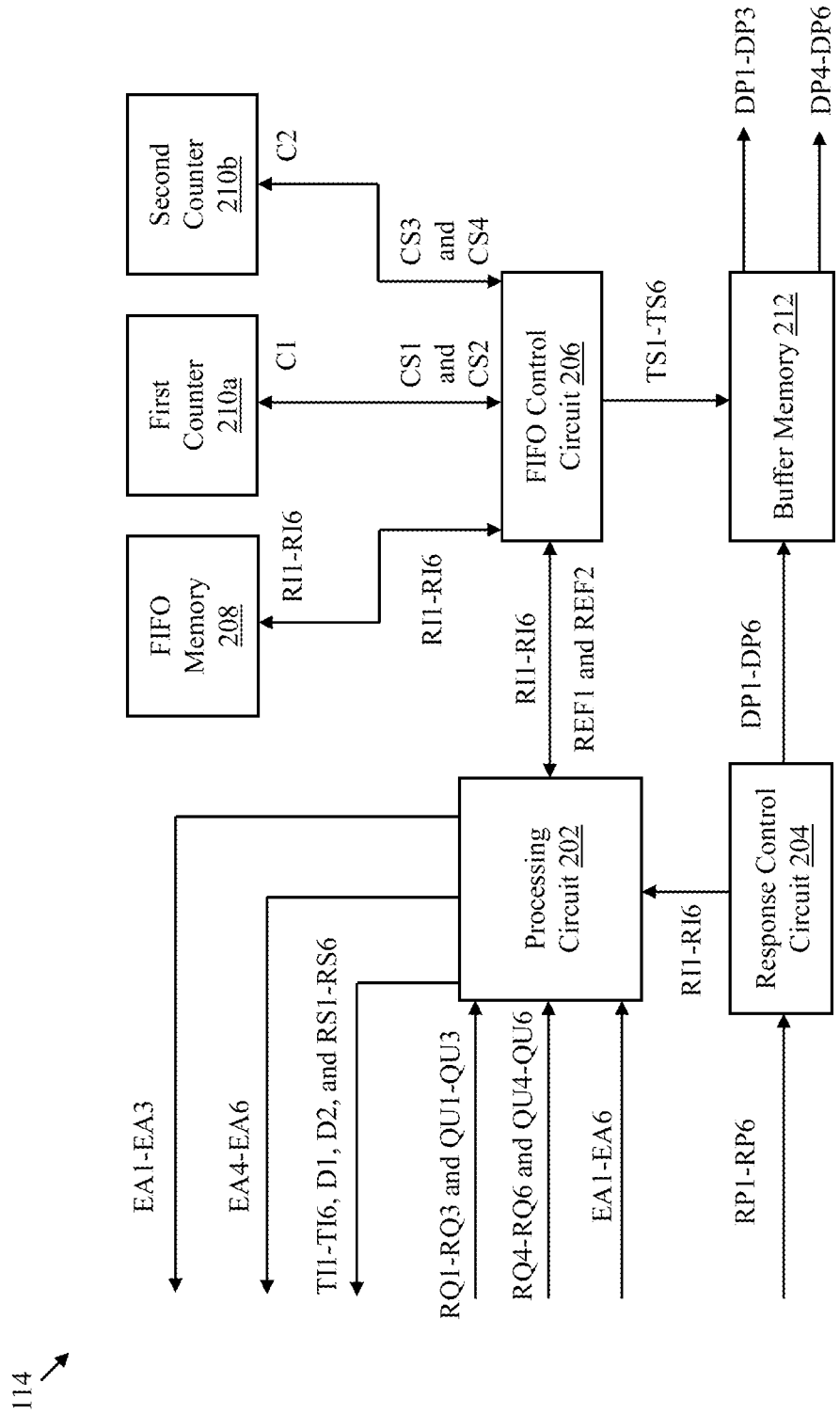
FIG. 2 illustrates a schematic block diagram of ordering circuitry of the SoC of FIG. 1 in accordance with an embodiment of the present disclosure.

FIG. 2 illustrates a schematic block diagram of the ordering circuitry 114 in accordance with an embodiment of the present disclosure. The ordering circuitry 114 includes a processing circuit 202, a response control circuit 204, a first-in-first-out (FIFO) control circuit 206, a FIFO memory 208, first and second counters 210a and 210b, and a buffer memory 212.

The processing circuit 202 is coupled with the storage circuit 110, and the first and second devices 102a and 102b. The processing circuit 202 may include suitable logic, circuitry, interfaces, and/or code, executable by the circuitry, that may be configured to perform one or more operations. For example, the processing circuit 202 is configured to receive, from the first device 102a, the first through third queries QU1-QU3 to retrieve entry addresses of available entries of the transaction table 112. When the first query QU1 is received, the processing circuit 202 is further configured to identify the first entry address EA1 of the first entry in the transaction table 112 that is available, and transmit the first entry address EA1 to the first device 102a as a response to the first query QU1. Similarly, when the second and third queries QU2 and QU3 are received, the processing circuit 202 is further configured to identify the second and third entry addresses EA2 and EA3 of the second and third entries in the transaction table 112 that are available, and transmit the second and third entry addresses EA2 and EA3 to the first device 102a as responses to the second and third queries QU2 and QU3, respectively. The first device 102a initiates the first through third transactions based on the first through third entry addresses EA1-EA3 such that the first through third entry addresses EA1-EA3 are the first through third transaction IDs TI1-TI3, respectively.

The processing circuit 202 is similarly configured to receive the fourth through sixth queries QU4-QU6 from the second device 102b, and transmit the fourth through sixth entry addresses EA4-EA6 to the second device 102b as responses to the fourth through sixth queries QU4-QU6, respectively. The second device 102b initiates the fourth through sixth transactions based on the fourth through sixth entry addresses EA4-EA6 such that the fourth through sixth entry addresses EA4-EA6 are the fourth through sixth transaction IDs TI4-TI6, respectively.

The processing circuit 202 is further configured to receive the first through sixth requests RQ1-RQ6 from the first and second devices 102a and 102b when the first through sixth transactions are initiated, respectively. The processing circuit 202 is further configured to store the first through sixth transaction IDs TI1-TI6 in the first through sixth entries of the transaction table 112 when the first through sixth requests RQ1-RQ6 are received, respectively. Further, the processing circuit 202 is configured to store the first device ID D1 in the first through third entries of the transaction table 112 when the first through third requests RQ1-RQ3 are received, respectively. Similarly, when the fourth through sixth requests RQ4-RQ6 are received, the processing circuit 202 is further configured to store the second device ID D2 in the fourth through sixth entries of the transaction table 112, respectively. Further, when the second and third requests RQ2 and RQ3 are received, the processing circuit 202 is further configured to store the second and third transaction IDs TI2 and TI3 in the first and second entries of the transaction table 112, respectively. Similarly, when the fifth and sixth requests RQ5 and RQ6 are received, the processing circuit 202 is further configured to store the fifth and sixth transaction IDs TI5 and TI6 in the fourth and fifth entries of the transaction table 112, respectively.

When the first request RQ1 is received, the processing circuit 202 is further configured to generate the first and second pointer values associated with the first device 102a such that each pointer value of the first and second pointer values is equal to the first transaction ID TI1. Further, when the second and third requests RQ2 and RQ3 are received, the second pointer value is updated from the first transaction ID TI1 to the second transaction ID TI2, and from the second transaction ID TI2 to the third transaction ID TI3, respectively. Similarly, when the fourth request RQ4 is received, the processing circuit 202 is further configured to generate the third and fourth pointer values associated with the second device 102b such that each pointer value of the third and fourth pointer values is equal to the fourth transaction ID TI4. Further, when the fifth and sixth requests RQ5 and RQ6 are received, the fourth pointer value is updated from the fourth transaction ID TI4 to the fifth transaction ID TI5, and from the fifth transaction ID TI5 to the sixth transaction ID TI6, respectively.

The processing circuit 202 is further coupled with the response control circuit 204, and configured to receive the first through sixth response IDs (hereinafter referred to and designated as the "first through sixth response IDs RI1-

RI6"), respectively. On receiving each response ID, the processing circuit 202 is configured to generate a reception status bit, and determine whether the received response ID matches one of the first through sixth transaction IDs TI1-TI6 stored in the transaction table 112. When the received response ID matches one of the first through sixth transaction IDs TI1-TI6, the processing circuit 202 is further configured to store the generated reception status bit in an entry of the transaction table 112 that is associated with the transaction ID that matches the received response ID. Thus, when the first through sixth response IDs RI1-RI6 are received, the processing circuit 202 is configured to generate the first through sixth reception status bits RS1-RS6 such that the first through sixth reception status bits RS1-RS6 are activated, and determine whether the first through sixth response IDs RI1-RI6 match the first through sixth transaction IDs TI1-TI6, respectively. When the first through sixth response IDs RI1-RI6 match the first through sixth transaction IDs TI1-TI6, respectively, the processing circuit 202 is further configured to store the first through sixth reception status bits RS1-RS6 in the first through sixth entries of the transaction table 112 that are associated with the first through sixth transaction IDs TI1-TI6, respectively.

The processing circuit 202 is further configured to determine whether the reception status bit associated with one of the first and third pointer values is activated. When the reception status bit associated with one of the first and third pointer values is activated, the processing circuit 202 is further configured to transmit the corresponding response ID to the FIFO control circuit 206 to facilitate the transmission of the corresponding set of data packets to one of the first and second devices 102a and 102b, respectively. For example, the first and third pointer values are equal to the first and fourth transaction IDs TI1 and TI4 prior to the reception of the first through sixth responses RP1-RP6. Thus, when any response IDs other than the first and fourth response IDs RI1 and RI4 are received, the received response IDs are not transmitted to the FIFO control circuit 206. However, the corresponding reception status bits of the received response IDs are activated and stored in the transaction table 112.

When the first response ID RI1 is received, the processing circuit 202 generates the first reception status bit RS1 in an activated state and stores the first reception status bit RS1 in the activated state in the first entry of the transaction table 112. As the reception status bit associated with the first pointer value is activated, the processing circuit 202 is further configured to transmit the first response ID RI1 to the FIFO control circuit 206 to facilitate the transmission of the first set of data packets DP1 to the first device 102a. The processing circuit 202 is further configured to receive a first reference signal REF1 associated with the first device 102a from the FIFO control circuit 206. In an embodiment, the first reference signal REF1 is activated to indicate successful transmission of the first set of data packets DP1 to the first device 102a. Based on the first reference signal REF1, the processing circuit 202 is further configured to extract the second transaction ID TI2 from the first transaction data (i.e., transaction data associated with the first pointer value), and update the first pointer value from the first transaction ID TI1 to the second transaction ID TI2. The processing circuit 202 is further configured to determine whether the reception status bit associated with the first pointer value (i.e., the second reception status bit RS2) is activated. The processing circuit 202 is further configured to transmit the second response ID RI2 to the FIFO control circuit 206 to facilitate the transmission of the second set of data packets DP2 to the first device 102a when the second reception status bit RS2 is activated.

It will be apparent to a person skilled in the art that the processing circuit 202 may similarly be configured to transmit the third response ID RI3 to the FIFO control circuit 206 when the first pointer value is equal to the third transaction ID TI3 and the third reception status bit RS3 is activated. Similarly, the processing circuit 202 is further configured to transmit the fourth through sixth response IDs RI4-RI6 to the FIFO control circuit 206 when the third pointer value is equal to the fourth through sixth transaction IDs TI4-TI6 and the fourth through sixth reception status bits RS4-RS6 are activated, respectively. In such a scenario, the processing circuit 202 is further configured to update the third pointer value based on a second reference signal REF2 that is associated with the second device 102b and received from the FIFO control circuit 206.

The response control circuit 204 is coupled with the interconnect 104, the buffer memory 212, and the processing circuit 202, and further coupled with the third device 106 by way of the interconnect 104. The response control circuit 204 may include suitable logic, circuitry, interfaces, and/or code, executable by the circuitry, that may be configured to perform one or more operations. For example, the response control circuit 204 is configured to receive the first through sixth responses RP1-RP6 from the interconnect 104. The first through sixth responses RP1-RP6 include the first through sixth response IDs RI1-RI6 and the first through sixth sets of data packets DP1-DP6, respectively. The first through sixth responses RP1-RP6 may be received in one of a sequential manner and an out-of-order manner. The response control circuit 204 is further configured to transmit the first through sixth response IDs RI1-RI6 to the processing circuit 202. The response control circuit 204 is further configured to store the first through sixth sets of data packets DP1-DP6 in the buffer memory 212.

The FIFO control circuit 206 is coupled with the processing circuit 202, the FIFO memory 208, the first and second counters 210a and 210b, and the buffer memory 212. The FIFO control circuit 206 may include suitable logic, circuitry, interfaces, and/or code, executable by the circuitry, that may be configured to perform one or more operations. For example, the FIFO control circuit 206 is configured to receive the first through sixth response IDs RI1-RI6 from the processing circuit 202 and store the first through sixth response IDs RI1-RI6 in the FIFO memory 208. The FIFO control circuit 206 is further configured to receive first and second counts C1 and C2 (i.e., first and second sets of count bits (not shown) of the first and second counts C1 and C2, respectively) associated with the first and second devices 102a and 102b from the first and second counters 210a and 210b, respectively.

The FIFO control circuit 206 is further configured to retrieve a response ID from the FIFO memory 208 that is at a first location of the FIFO memory 208. The first location of the FIFO memory 208 corresponds to a top of the FIFO memory 208. The retrieved response ID may be associated with one of the first and second devices 102a and 102b. If the retrieved response ID is associated with the first device 102a, the FIFO control circuit 206 is further configured to determine whether the first count C1 is less than a first threshold value (not shown). When the first count C1 is less than the first threshold value, the FIFO control circuit 206 is further configured to generate transmission status data based on the retrieved response ID, and transmit the transmission status data to the buffer memory 212 to facilitate the transmission of the corresponding set of data packets to the first device 102a. In such a scenario, the FIFO control circuit 206 is further configured to generate and transmit the first reference signal REF1 in an activated state (i.e., in a logic high state) to the processing circuit 202. The FIFO control circuit 206 is further configured to generate and transmit a first control signal CS1 in an activated state (i.e., in a logic high state) to the first counter 210a to increment the first count C1. Alternatively, when the first count C1 is equal to the first threshold value, the FIFO control circuit 206 is further configured to re-store the retrieved response ID in the FIFO memory 208. In such a scenario, the FIFO control circuit 206 is further configured to generate and transmit a second control signal CS2 in an activated state (i.e., in a logic high state) to the first counter 210a to reset the first counter 210a.

It will be apparent to a person skilled in the art that if the retrieved response ID is associated with the second device 102b, the FIFO control circuit 206 is further configured to determine whether the second count C2 is less than a second threshold value (not shown). When the second count C2 is less than the second threshold value, the FIFO control circuit 206 is further configured to generate and transmit, based on the retrieved response ID, corresponding transmission status data to the buffer memory 212. The FIFO control circuit 206 is further configured to generate and transmit the second reference signal REF2 in an activated state (i.e., in a logic high state) to the processing circuit 202. Further, the FIFO control circuit 206 is further configured to generate and transmit a third control signal CS3 in an activated state (i.e., in a logic high state) to the second counter 210b to increment the second count C2. Alternatively, when the second count C2 is equal to the second threshold value, the FIFO control circuit 206 is further configured to re-store the retrieved response ID in the FIFO memory 208, and generate and transmit a fourth control signal CS4 in an activated state (i.e., in a logic high state) to the second counter 210b to reset the second counter 210b. In one embodiment, the first and second threshold values are equal. In another embodiment, the first and second threshold values are unequal.

It will be apparent to a person skilled in the art that the FIFO control circuit 206 thus generates first through sixth transmission status data TS1-TS6 based on the first through sixth response IDs RI1-RI6 in the above-described manner. Further, the FIFO control circuit 206 is configured to transmit the first through third transmission status data TS1-TS3 to the buffer memory 212 to facilitate the transmission of the first through third sets of data packets DP1-DP3 to the first device 102a, respectively. Similarly, the FIFO control circuit 206 is configured to transmit the fourth through sixth transmission status data TS4-TS6 to the buffer memory 212 to facilitate the transmission of the fourth through sixth sets of data packets DP4-DP6 to the second device 102b, respectively.

The FIFO memory 208 is coupled with the FIFO control circuit 206. The FIFO memory 208 may include suitable logic, circuitry, interfaces, and/or code, executable by the circuitry, that may be configured to perform one or more operations. For example, the FIFO memory 208 is configured to store the first through sixth response IDs RI1-RI6. At any instance, the FIFO memory 208 may store a maximum of one response ID associated with the first device 102a and a maximum of one response ID associated with the second device 102b.

The first and second counters 210a and 210b are coupled with the FIFO control circuit 206. The first and second counters 210a and 210b may include suitable logic, circuitry, interfaces, and/or code, executable by the circuitry, that may be configured to perform one or more operations. For example, the first and second counters 210a and 210b are configured to generate the first and second counts C1 and C2 associated with the first and second devices 102a and 102b, respectively, and transmit the first and second counts C1 and C2 (i.e., the first and second sets of count bits of the first and second counts C1 and C2, respectively) to the FIFO control circuit 206. The first and second counts C1 and C2 are indicative of a number of transactions associated with the first and second devices 102a and 102b that are processed, respectively. The first and second counts C1 and C2, in combination with the first and second threshold values, ensure that each device of the first and second devices 102a and 102b is equally serviced, thereby reducing latencies of the first and second devices 102a and 102b.

The first counter 210a is further configured to receive the first and second control signals CS1 and CS2 from the FIFO control circuit 206. Based on the first control signal CS1, the first counter 210a is further configured to increment the first count C1. Similarly, based on the second control signal CS2, the first counter 210a is further configured to reset the first count C1. In an embodiment, the first count C1 is incremented and reset when the first and second control signals CS1 and CS2 are activated, respectively. The second counter 210b is similarly configured to receive the third and fourth control signals CS3 and CS4 from the FIFO control circuit 206. Based on the third control signal CS3, the second counter 210b is further configured to increment the second count C2. Further, based on the fourth control signal CS4, the second counter 210b is further configured to reset the second count C2.

The buffer memory 212 is coupled with response control circuit 204 and the FIFO control circuit 206. The buffer memory 212 may include suitable logic, circuitry, interfaces, and/or code, executable by the circuitry, that may be configured to perform one or more operations. For example, the buffer memory 212 is configured to receive and store the first through sixth sets of data packets DP1-DP6 from the response control circuit 204. The buffer memory is further configured to receive the first through sixth transmission status data TS1-TS6 from the FIFO control circuit 206. Based on the first through third transmission status data TS1-TS3, the buffer memory 212 is further configured to transmit the first through third sets of data packets DP1-DP3 to the first device 102a, respectively. Similarly, based on the fourth through sixth transmission status data TS4-TS6, the buffer memory 212 is further configured to transmit the fourth through sixth sets of data packets DP4-DP6 to the second device 102b, respectively.

In operation, the first device 102a initiates the first through third transactions for executing the first through third transactions with the third device 106. The first device 102a initiates the first through third transactions in a sequential manner (i.e., the second transaction is initiated after the first transaction and the third transaction is initiated after the second transaction). Similarly, the second device 102b initiates the fourth through sixth transactions for executing the fourth through sixth transactions with the third device 106. The second device 102b initiates the fourth through sixth transactions in a sequential manner (i.e., the fifth transaction is initiated after the fourth transaction and the sixth transaction is initiated after the fifth transaction). In one example, the fourth transaction is initiated after the third transaction. In other words, the first through sixth transactions are initiated sequentially.

Prior to initiating the first through third transactions, the first device 102a generates and transmits the first through third queries QU1-QU3 to the processing circuit 202 to retrieve the entry addresses of available entries of the transaction table 112. Similarly, prior to initiating the fourth through sixth transactions, the second device 102b generates and transmits the fourth through sixth queries QU4-QU6 to the processing circuit 202. Based on each received query, the processing circuit 202 identifies an entry address of an available entry of the transaction table 112. For example, based on the first through sixth queries QU1-QU6, the processing circuit 202 identifies the first through sixth entry addresses EA1-EA6 of the first through sixth entries that are available in the transaction table 112 when the first through sixth queries QU1-QU6 are received, respectively. The processing circuit 202 transmits the first through third entry addresses EA1-EA3 to the first device 102a as responses to the first through third queries QU1-QU3, respectively. Similarly, the processing circuit 202 transmits the fourth through sixth entry addresses EA4-EA6 to the second device 102b as responses to the fourth through sixth queries QU4-QU6, respectively. Further, the first through sixth transactions are initiated such that the first through sixth entry addresses EA1-EA6 are the first through sixth transaction IDs TI1-TI6, respectively.

Although it is described that the fourth transaction is initiated after the third transaction, it will be apparent to a person skilled in the art that the scope of the present disclosure is not limited to it. In various other embodiments, the fourth transaction may be initiated while any of the first through third transactions are initiated, without deviating from the scope of the present disclosure. In such a scenario, the entry addresses transmitted to the first and second devices 102a and 102b are in accordance with the order in which the first through sixth transactions are initiated.

The first device 102a generates the first through third requests RQ1-RQ3 based on the initiation of the first through third transactions, respectively, and transmits the first through third requests RQ1-RQ3 to the interconnect 104 and the processing circuit 202. Similarly, the second device 102b generates the fourth through sixth requests RQ4-RQ6 based on the initiation of the fourth through sixth transactions, respectively, and transmits the fourth through sixth requests RQ4-RQ6 to the interconnect 104 and the processing circuit 202. The interconnect 104 transmits the first through sixth requests RQ1-RQ6 to the third device 106.

When the first through sixth requests RQ1-RQ6 are received by the processing circuit 202, the processing circuit 202 stores the first through sixth transaction IDs TI1-TI6 in the first through sixth entries of the transaction table 112, respectively. Further, the processing circuit 202 stores the first device ID D1 in the first through third entries of the transaction table 112 when the first through third requests RQ1-RQ3 are received, respectively. Similarly, the processing circuit 202 stores the second device ID D2 in the fourth through sixth entries of the transaction table 112 when the fourth through sixth requests RQ4-RQ6 are received, respectively. Further, when the second and third requests RQ2 and RQ3 are received, the processing circuit 202 stores the second and third transaction IDs TI2 and TI3 in the first and second entries of the transaction table 112, respectively. Similarly, when the fifth and sixth requests RQ5 and RQ6 are received, the processing circuit 202 stores the fifth and sixth transaction IDs TI5 and TI6 in the fourth and fifth entries of the transaction table 112, respectively.

The processing circuit 202 further generates the first and second pointer values associated with the first device 102a, and the third and fourth pointer values associated with the second device 102b. The first pointer value is indicative of a transaction ID of a transaction that is to be processed (i.e., a set of data packets that is to be transmitted to the first device 102a), and the second pointer value is indicative of a transaction ID of a latest transaction that is initiated by the first device 102a. Similarly, the third pointer value is indicative of a transaction ID of a transaction that is to be processed (i.e., a set of data packets that is to be transmitted to the second device 102b), and the fourth pointer value is indicative of a transaction ID of a latest transaction that is initiated by the second device 102b.

When the first request RQ1 is received, each pointer value of the first and second pointer values is equal to the first transaction ID TI1. Similarly, when the fourth request RQ4 is received, each pointer value of the third and fourth pointer values is equal to the fourth transaction ID TI4. Further, when the second and third requests RQ2 and RQ3 are received, the second pointer value is updated from the first transaction ID TI1 to the second transaction ID TI2, and from the second transaction ID TI2 to the third transaction ID TI3, respectively. Similarly, when the fifth and sixth requests RQ5 and RQ6 are received, the fourth pointer value is updated from the fourth transaction ID TI4 to the fifth transaction ID TI5, and from the fifth transaction ID TI5 to the sixth transaction ID TI6, respectively.

The third device 106 (i.e., the memory controller) executes, based on the first through sixth requests RQ1-RQ6, the first through sixth transactions on the memory, and generates the first through sixth responses RP1-RP6, respectively. The first through sixth responses RP1-RP6 include the first through sixth response IDs RI1-RI6 and the first through sixth sets of data packets DP1-DP6 read from the memory, respectively. The first through sixth response IDs RI1-RI6 are same as the first through sixth transaction IDs TI1-TI6, respectively. The memory controller further transmits the first through sixth responses RP1-RP6 to the interconnect 104. The interconnect 104 transmits the first through sixth responses RP1-RP6 to the response control circuit 204. The first through sixth responses RP1-RP6 may be transmitted to the interconnect 104, and in turn, from the interconnect 104 to the response control circuit 204 in one of a sequential manner and an out-of-order manner. The response control circuit 204 thus receives the first through sixth responses RP1-RP6 from the third device 106 by way of the interconnect 104. For the sake of ongoing discussion, it is assumed that the response control circuit 204 receives the first through sixth responses RP1-RP6 in an out-of-order manner. In one example, the second response RP2 is received before the first response RP1, the fourth response RP4 is received after the first response RP1 and before the third response RP3, and the sixth response RP6 is received after the third response RP3 and before the fifth response RP5. In other words, the response control circuit 204 receives the first through sixth responses RP1-RP6 in the following order: the second response RP2, the first response RP1, the fourth response RP4, the third response RP3, the sixth response RP6, and the fifth response RP5.

When the second response RP2 is received, the response control circuit 204 transmits the second response ID RI2 to the processing circuit 202 and stores the second set of data packets DP2 in the buffer memory 212. When the second response ID RI2 is received, the processing circuit 202 generates the second reception status bit RS2 such that the second reception status bit RS2 is activated. The processing circuit 202 further determines whether the received response ID (i.e., the second response ID RI2) matches any of the first through sixth transaction IDs TI1-TI6. As the second response ID RI2 is same as the second transaction ID TI2, the processing circuit 202 stores the second reception status bit RS2 in the second entry of the transaction table 112 that is associated with the second transaction ID TI2. The processing circuit 202 further determines whether the reception status bit associated with the first pointer value (i.e., the first transaction ID TI1) is activated. In other words, the processing circuit 202 further determines whether the first reception status bit RS1 is activated. As the first reception status bit RS1 is deactivated (i.e., as the first response RP1 is not received), the second response ID RI2 is not transmitted to the FIFO control circuit 206.

When the first response RP1 is received, the response control circuit 204 transmits the first response ID RI1 to the processing circuit 202 and stores the first set of data packets DP1 in the buffer memory 212. When the first response ID RI1 is received, the processing circuit 202 generates the first reception status bit RS1 such that the first reception status bit RS1 is activated. The processing circuit 202 then determines whether the received response ID (i.e., the first response ID RI1) matches any of the first through sixth transaction IDs TI1-TI6. As the first response ID RI1 is same as the first transaction ID TI1, the processing circuit 202 stores the first reception status bit RS1 in the first entry of the transaction table 112 that is associated with the first transaction ID TI1. The processing circuit 202 further determines whether the reception status bit associated with the first pointer value is activated (i.e., whether the first reception status bit RS1 is activated). As the first reception status bit RS1 is activated, the processing circuit 202 transmits the first response ID RI1 to the FIFO control circuit 206.

The FIFO control circuit 206 stores the first response ID RI1 in the FIFO memory 208. The FIFO control circuit 206 further receives the first and second counts C1 and C2 from the first and second counters 210a and 210b, respectively. Further, the FIFO control circuit 206 retrieves a response ID that is at the first location of the FIFO memory 208. For the sake of ongoing discussion, it is assumed that the first response ID RI1 is at the first location of the FIFO memory 208. The FIFO control circuit 206 then determines whether the first response ID RI1 is associated with one of the first and second devices 102a and 102b. As the first response ID RI1 is associated with the first device 102a, the FIFO control circuit 206 determines whether the first count C1 associated with the first device 102a is less than the first threshold value. For the sake of ongoing discussion, it is assumed that the first count C1 is less than the first threshold value. In such a scenario, the FIFO control circuit 206 generates the first transmission status data TS1 based on the first response ID RI1, and transmits the first transmission status data TS1 to the buffer memory 212. In an embodiment, the first transmission status data TS1 includes the first response ID RI1 Based on the first transmission status data TS1, the buffer memory 212 transmits the first set of data packets DP1 to the first device 102a.

The FIFO control circuit 206 further generates the first reference signal REF1 in an activated state, and transmits the first reference signal REF1 to the processing circuit 202. Further, the FIFO control circuit 206 generates the first control signal CS1 in an activated state, and transmits the first control signal CS1 to the first counter 210a. The first reference signal REF1 is activated to indicate successful transmission of the first set of data packets DP1 to the first device 102a, and the first control signal CS1 is activated to increment the first count C1. The first reference signal REF1 and the first control signal CS1 are deactivated (i.e., are at logic low states) after a predetermined time duration.

Based on the first reference signal REF1, the processing circuit 202 extracts the second transaction ID TI2 from the first transaction data (i.e., transaction data associated with the first pointer value) stored in the transaction table 112, and updates the first pointer value from the first transaction ID TI1 to the second transaction ID TI2. In one embodiment, when the first pointer value is updated, the processing circuit 202 may further be configured to delete the first transaction data from the transaction table 112. The processing circuit 202 further determines whether the reception status bit associated with the first pointer value is activated (i.e., whether the second reception status bit RS2 is activated). As the second reception status bit RS2 is activated (i.e., as the second response RP2 is received), the processing circuit 202 transmits the second response ID RI2 to the FIFO control circuit 206.

The FIFO control circuit 206 stores the second response ID RI2 in the FIFO memory 208. Further, the FIFO control circuit 206 retrieves a response ID that is at the first location of the FIFO memory 208. For the sake of ongoing discussion, it is assumed that the second response ID RI2 is at the first location of the FIFO memory 208. The FIFO control circuit 206 then determines whether the second response ID RI2 is associated with one of the first and second devices 102a and 102b. As the second response ID RI2 is associated with the first device 102a, the FIFO control circuit 206 determines whether the first count C1 associated with the first device 102a is less than the first threshold value. For the sake of ongoing discussion, it is assumed that the first count C1 is less than the first threshold value. In such a scenario, the FIFO control circuit 206 generates the second transmission status data TS2 based on the second response ID RI2, and transmits the second transmission status data TS2 to the buffer memory 212. Based on the second transmission status data TS2, the buffer memory 212 transmits the second set of data packets DP2 to the first device 102a.

Thus, although the second response RP2 is received before the first response RP1, the transaction ordering system 108 transmits the second set of data packets DP2 to the first device 102a exclusively after the first set of data packets DP1 is transmitted. The transaction ordering system 108 thus orders the first and second transactions. The FIFO control circuit 206 further activates the first reference signal REF1 and the first control signal CS1. The first count C1 is thus incremented. Based on the first reference signal REF1, the processing circuit 202 extracts the third transaction ID TI3 from the second transaction data (i.e., transaction data associated with the first pointer value) stored in the transaction table 112, and updates the first pointer value from the second transaction ID TI2 to the third transaction ID TI3. In one embodiment, when the first pointer value is updated, the processing circuit 202 may further be configured to delete the second transaction data from the transaction table 112.

The processing circuit 202 then determines whether the reception status bit associated with the first pointer value is activated (i.e., whether the third reception status bit RS3 is activated). As the third reception status bit RS3 is deactivated (i.e., as the third response RP3 is not received), the processing circuit 202 determines whether the reception status bit associated with the third pointer value is activated (i.e., whether the fourth reception status bit RS4 is activated). As the fourth reception status bit RS4 is deactivated (i.e., as the fourth response RP4 is not received), the operations of the processing circuit 202 and the FIFO control circuit 206 are halted.

While the processing circuit 202 is updating the first pointer value, the response control circuit 204 receives the fourth and third responses RP4 and RP3 sequentially. The response control circuit 204 transmits the fourth and third response IDs RI4 and RI3 to the processing circuit 202 and stores the fourth and third sets of data packets DP4 and DP3 in the buffer memory 212. When the fourth and third response IDs RI4 and RI3 are received, the processing circuit 202 generates the fourth and third reception status bits RS4 and RS3 such that the fourth and third reception status bits RS4 and RS3 are activated, respectively. The processing circuit 202 then determines whether the received response IDs (i.e., the fourth and third response IDs RI4 and RI3) match any of the third through sixth transaction IDs TI3-TI6. As the fourth and third response IDs RI4 and RI3 are same as the fourth and third transaction IDs TI4 and TI3, the processing circuit 202 stores the fourth and third reception status bits RS4 and RS3 in the fourth and third entries of the transaction table 112 that are associated with the fourth and third transaction IDs TI4 and TI3, respectively. The processing circuit 202 then determines whether the reception status bit associated with the first and third pointer values are activated (i.e., whether the third and fourth reception status bits RS3 and RS4 are activated). As the third and fourth reception status bits RS3 and RS4 are activated, the processing circuit 202 transmits the fourth and third response IDs RI4 and RI3 to the FIFO control circuit 206. The fourth response ID RI4 is transmitted to the FIFO control circuit 206 before the third response ID RI3 as the fourth response RP4 is received before the third response RP3.

The FIFO control circuit 206 stores the fourth and third response IDs RI4 and RI3 in the FIFO memory 208 sequentially. Further, the FIFO control circuit 206 retrieves a response ID that is at the first location of the FIFO memory 208. For the sake of ongoing discussion, it is assumed that the fourth response ID RI4 is at the first location of the FIFO memory 208. The FIFO control circuit 206 then determines whether the fourth response ID RI4 is associated with one of the first and second devices 102a and 102b. As the fourth response ID RI4 is associated with the second device 102b, the FIFO control circuit 206 determines whether the second count C2 associated with the second device 102b is less than the second threshold value. For the sake of ongoing discussion, it is assumed that the second count C2 is less than the second threshold value. In such a scenario, the FIFO control circuit 206 generates the fourth transmission status data TS4 based on the fourth response ID RI4, and transmits the fourth transmission status data TS4 to the buffer memory 212. Based on the fourth transmission status data TS4, the buffer memory 212 transmits the fourth set of data packets DP4 to the second device 102b.

The FIFO control circuit 206 further generates the second reference signal REF2 associated with the second device 102b in an activated state, and transmits the second reference signal REF2 to the processing circuit 202. Further, the FIFO control circuit 206 generates the third control signal CS3 in an activated state, and transmits the third control signal CS3 to the second counter 210b. The second reference signal REF2 is activated to indicate successful transmission of the fourth set of data packets DP4 to the second device 102b, and the third control signal CS3 is activated to increment the second count C2. The second reference signal REF2 and third control signal CS3 are deactivated (i.e., are at logic low states) after the predetermined time duration. Based on the second reference signal REF2, the processing circuit 202 extracts the fifth transaction ID TI5 from the fourth transaction data (i.e., transaction data associated with the third pointer value) stored in the transaction table 112, and updates the third pointer value from the fourth transaction ID TI4 to the fifth transaction ID TI5. In one embodiment, when the third pointer value is updated, the processing circuit 202 may further be configured to delete the fourth transaction data from the transaction table 112.

The FIFO control circuit 206 further retrieves a response ID that is at the first location of the FIFO memory 208. For the sake of ongoing discussion, it is assumed that the third response ID RI3 is at the first location of the FIFO memory 208. The FIFO control circuit 206 then determines whether the third response ID RI3 is associated with one of the first and second devices 102a and 102b. As the third response ID RI3 is associated with the first device 102a, the FIFO control circuit 206 determines whether the first count C1 associated with the first device 102a is less than the first threshold value. For the sake of ongoing discussion, it is assumed that the first count C1 is less than the first threshold value. In such a scenario, the FIFO control circuit 206 generates the third transmission status data TS3 based on the third response ID RI3, and transmits the third transmission status data TS3 to the buffer memory 212. The buffer memory 212 transmits the third set of data packets DP3 to the first device 102a based on the third transmission status data TS3. Thus, the first through third sets of data packets DP1-DP3 are transmitted to the first device 102a in a sequential manner.

It will be apparent to a person skilled in the art that if the seventh transaction is initiated by the first device 102a after the third transaction, the processing circuit 202 may further be configured to update the first pointer value from the third transaction ID TI3 to the seventh transaction ID and delete the third transaction data from the transaction table 112 upon updating the first pointer value.

Although it is described that the first count C1 is less than the first threshold value for each of the first through third response IDs RI1-RI3, it will be apparent to a person skilled in the art that the scope of the present disclosure is not limited to it. In an alternate embodiment, after retrieving the second response ID RI2, the FIFO control circuit 206 may determine that the first count C1 associated with the first device 102a is equal to the first threshold value. In such a scenario, the FIFO control circuit 206 may re-store the second response ID RI2 in the FIFO memory 208, and generate and transmit the second control signal CS2 in an activated state to the first counter 210a to reset the first count C1. The second response ID RI2 may then be retrieved from the FIFO memory 208 when the second response ID RI2 is at the first location of the FIFO memory 208.

The response control circuit 204 may then receive the sixth response RP6. When the sixth response RP6 is received, the response control circuit 204 transmits the sixth response ID RI6 to the processing circuit 202, and stores the sixth set of data packets DP6 in the buffer memory 212. When the sixth response ID RI6 is received, the processing circuit 202 generates the sixth reception status bit RS6 such that the sixth reception status bit RS6 is activated. The processing circuit 202 then determines whether the received response ID (i.e., the sixth response ID RI6) matches any of the fifth and sixth transaction IDs TI5 and TI6. As the sixth response ID RI6 is same as the sixth transaction ID TI6, the processing circuit 202 stores the sixth reception status bit RS6 in the sixth entry of the transaction table 112 that is associated with the sixth transaction ID TI6. The processing circuit 202 further determines whether the reception status bit associated with the third pointer value (i.e., the fifth transaction ID TI5) is activated. In other words, the processing circuit 202 further determines whether the fifth reception status bit RS5 is activated. As the fifth reception status bit RS5 is deactivated (i.e., as the fifth response RP5 is not received), the sixth response ID RI6 is not transmitted to the FIFO control circuit 206.

When the fifth response RP5 is received, the response control circuit 204 transmits the fifth response ID RI5 to the processing circuit 202, and stores the fifth set of data packets DP5 in the buffer memory 212. When the fifth response ID RI5 is received, the processing circuit 202 generates the fifth reception status bit RS5 such that the fifth reception status bit RS5 is activated. The processing circuit 202 then determines whether the received response ID (i.e., the fifth response ID RI5) matches any of the fifth and sixth transaction IDs TI5 and TI6. As the fifth response ID RI5 is same as the fifth transaction ID TI5, the processing circuit 202 stores the fifth reception status bit RS5 in the fifth entry of the transaction table 112 that is associated with the fifth transaction ID TI5. The processing circuit 202 further determines whether the reception status bit associated with the third pointer value is activated (i.e., whether the fifth reception status bit RS5 is activated). As the fifth reception status bit RS5 is activated, the processing circuit 202 transmits the fifth response ID RI5 to the FIFO control circuit 206.

The FIFO control circuit 206 generates the fifth transmission status data TS5 in a similar manner as described above under the assumption that the second count C2 is less than the second threshold value. Further, the FIFO control circuit 206 transmits the fifth transmission status data TS5 to the buffer memory 212. Based on the fifth transmission status data TS5, the buffer memory 212 transmits the fifth set of data packets DP5 to the second device 102b. Additionally, the FIFO control circuit 206 activates the second reference signal REF2 and the second control signal CS2. Based on the second reference signal REF2, the processing circuit 202 extracts the sixth transaction ID TI6 from the fifth transaction data (i.e., transaction data associated with the third pointer value) stored in the transaction table 112, and updates the third pointer value from the fifth transaction ID TI5 to the sixth transaction ID TI6. In one embodiment, when the third pointer value is updated, the processing circuit 202 may further be configured to delete the fifth transaction data from the transaction table 112.

The processing circuit 202 further determines whether the reception status bit associated with the third pointer value is activated (i.e., whether the sixth reception status bit RS6 is activated). As the sixth reception status bit RS6 is activated (i.e., as the sixth response RP6 is received), the processing circuit 202 transmits the sixth response ID RI6 to the FIFO control circuit 206. The FIFO control circuit 206 generates the sixth transmission status data TS6 in a similar manner as described above under the assumption that the second count C2 is less than the second threshold value. Further, the FIFO control circuit 206 transmits the sixth transmission status data TS6 to the buffer memory 212. Based on the sixth transmission status data TS6, the buffer memory 212 transmits the sixth set of data packets DP6 to the second device 102b.

It will be apparent to a person skilled in the art that if the eighth transaction is initiated by the second device 102b after the sixth transaction, the processing circuit 202 may further be configured to update the third pointer value from the sixth transaction ID TI6 to the eighth transaction ID and delete the sixth transaction data from the transaction table 112. The transaction ordering system 108 thus orders the first through sixth transactions initiated by the first and second devices 102a and 102b.

FIG. 3 is a tabular diagram that illustrates the transaction table 112 in accordance with an embodiment of the present disclosure. The transaction table 112 includes rows that indicate the first through sixth entries (hereinafter referred to and designated as the "first through sixth entries 302-312"). The transaction table 112 further includes a "Transaction ID" column 314, a "Device ID" column 316, a "Next ID" column 318, and a "Reception Status Bit" column 320.

The "Transaction ID" column 314 of the first through sixth entries 302-312 includes the first through sixth transaction IDs TI1-TI6, respectively. The "Device ID" column 316 of the first through third entries 302-306 includes the first device ID D1 to indicate the association of the first through third transactions with the first device 102a, respectively. Similarly, the "Device ID" column 316 of the fourth through sixth entries 308-312 includes the second device ID D2 to indicate the association of the fourth through sixth transactions with the second device 102b, respectively.

The "Next ID" column 318 indicates the transaction ID of a transaction that is initiated after the corresponding transaction. In one example, the first entry 302 corresponds to the first transaction. Therefore, the "Next ID" column 318 of the first entry 302 stores the second transaction ID TI2 to indicate that the second transaction is initiated after the first transaction. Similarly, the "Next ID" column 318 of the second, fourth, and fifth entries 304, 308, and 310 includes the third transaction ID TI3, the fifth transaction ID TI5, and the sixth transaction ID TI6, respectively. The "Next ID" column 318 of the third and sixth entries 306 and 312 is empty. The "Next ID" column 318 of the third and sixth entries 306 and 312 is filled when the first and second devices 102a and 102b initiate subsequent transactions, respectively. The "Reception Status Bit" column 320 of the first through sixth entries 306-316 includes the first through sixth reception status bits RS1-RS6, respectively. When the first through sixth responses RP1-RP6 are yet to be received, the first through sixth reception status bits RS1-RS6 are deactivated (i.e., are set to "0"). Similarly, when the first through sixth responses RP1-RP6 are received, the first through sixth reception status bits RS1-RS6 are activated (i.e., are set to "1").

Although it is shown that the transaction table 112 includes the aforementioned columns (such as the "Transaction ID" column 314, the "Device ID" column 316, the "Next ID" column 318, and the "Reception Status Bit" column 320), the scope of the present disclosure is not limited to it. In various other embodiments, the transaction table 112 may include other columns (e.g., a burst size column, a burst length column, or the like), without deviating from the scope of the present disclosure.

FIGS. 4A-4E, collectively, represent a flow chart 400 that illustrates a method for ordering transactions in accordance with an embodiment of the present disclosure. The first device 102a initiates the first through third transactions in a sequential manner. Prior to initiating the transactions, the first device 102a generates the first through third queries QU1-QU3 to retrieve the entry addresses of available entries of the transaction table 112.

Figure 4A:
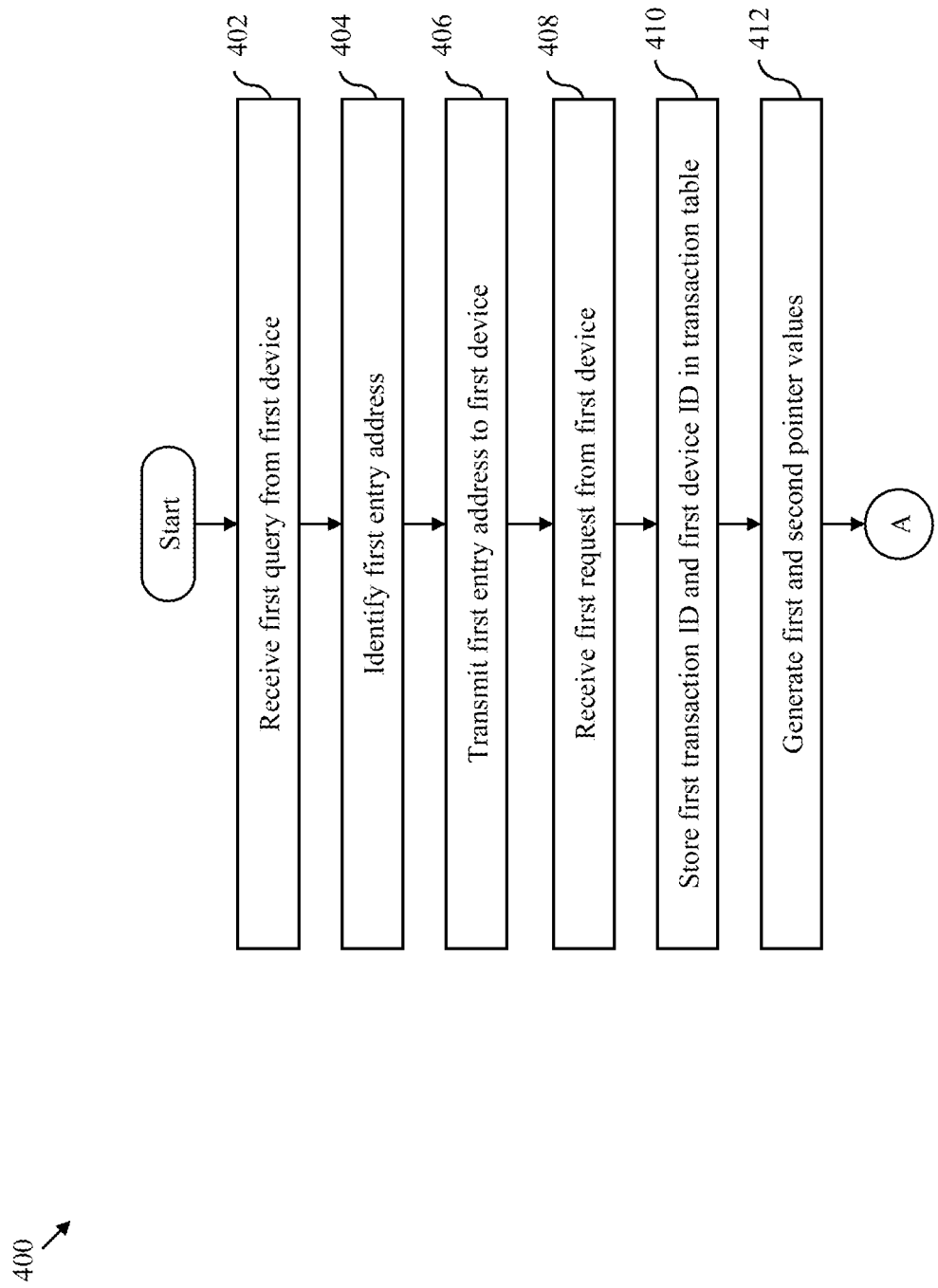
FIGS. 4A-4E, collectively, represent a flow chart that illustrates a method for ordering transactions in accordance with an embodiment of the present disclosure.

Referring now to FIG. 4A, at step 402, the ordering circuitry 114 of the transaction ordering system 108 receives the first query QU1 from the first device 102a. At step 404, the ordering circuitry 114 identifies the first entry address EA1 of the first entry 302 that is available. At step 406, the ordering circuitry 114 transmits the first entry address EA1 to the first device 102a as a response to the first query QU1. Based on the first entry address EA1, the first device 102a initiates the first transaction. The first transaction is initiated such that the first transaction has the first entry address EA1 as the first transaction ID TI1. Further, based on the initiation of the first transaction, the first device 102a generates the first request RQ1. At step 408, the ordering circuitry 114 receives the first request RQ1 from the first device 102a. At step 410, the ordering circuitry 114 stores the first transaction ID TI1 and the first device ID D1 in the transaction table 112. The ordering circuitry 114 stores the first transaction ID TI1 and the first device ID D1 in the first entry 302 of the transaction table 112. At step 412, the ordering circuitry 114 generates the first and second pointer values associated with the first device 102a such that when the first request RQ1 is received (i.e., when the first transaction is initiated), each pointer value of the first and second pointer values is equal to the first transaction ID TI1.

Figure 4B:
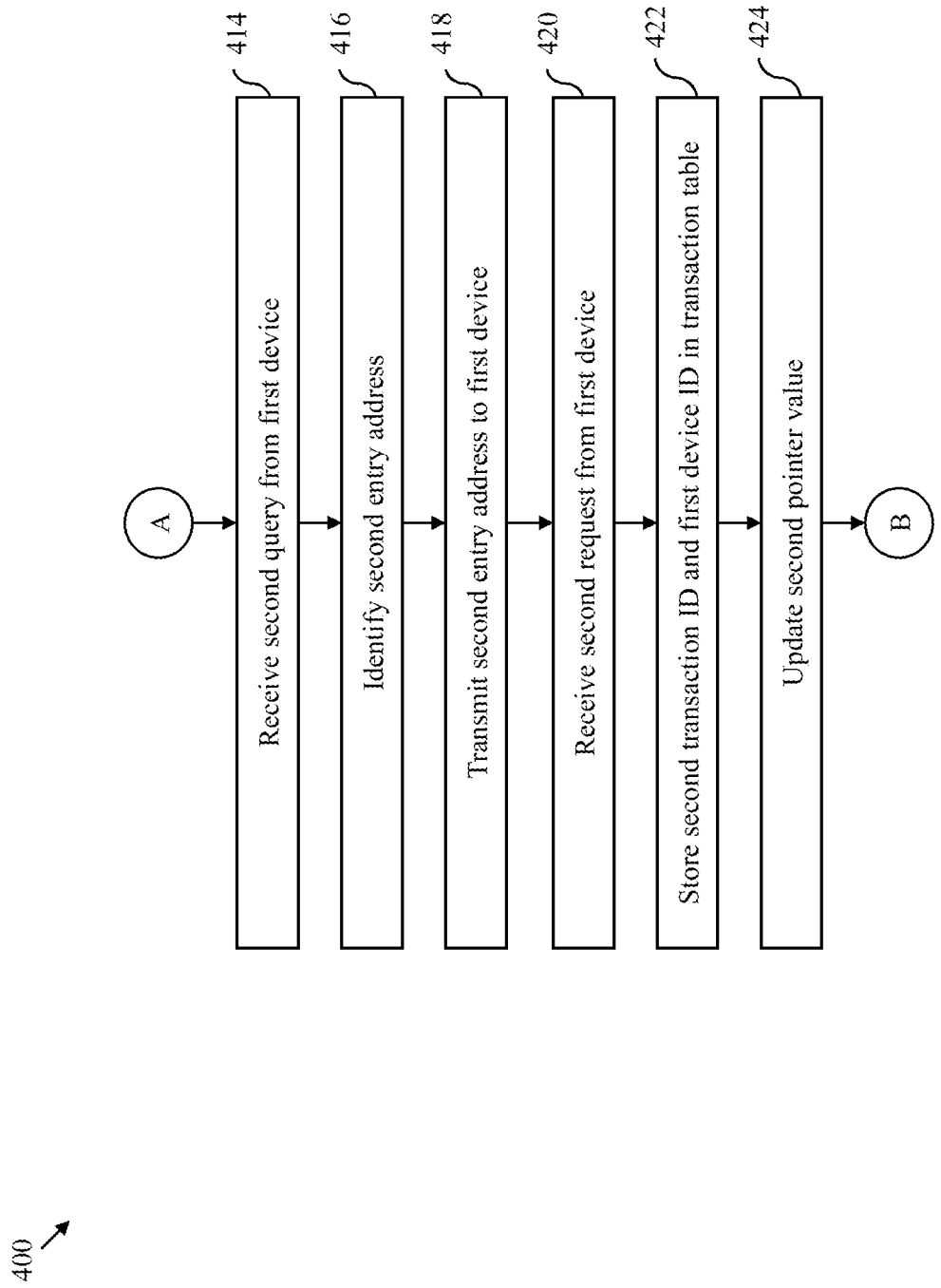

Referring now to FIG. 4B, at step 414, the ordering circuitry 114 receives the second query QU2 from the first device 102a. At step 416, the ordering circuitry 114 identifies the second entry address EA2 of the second entry 304 that is available. At step 418, the ordering circuitry 114 transmits the second entry address EA2 to the first device 102a as a response to the second query QU2. Based on the second entry address EA2, the first device 102a initiates the second transaction. The second transaction is initiated such that the second transaction has the second entry address EA2 as the second transaction ID TI2. Further, based on the initiation of the second transaction, the first device 102a generates the second request RQ2. At step 420, the ordering circuitry 114 receives the second request RQ2 from the first device 102a. At step 422, the ordering circuitry 114 stores the second transaction ID TI2 and the first device ID D1 in the transaction table 112. The ordering circuitry 114 stores the second transaction ID TI2 and the first device ID D1 in the second entry 304 of the transaction table 112. The ordering circuitry 114 further stores the second transaction ID TI2 in the first entry 302 of the transaction table 112 to indicate that the second transaction is initiated after the first transaction, and hence, is to be processed after the first transaction. At step 424, the ordering circuitry 114 updates the second pointer value from the first transaction ID TI1 to the second transaction ID TI2 when the second request RQ2 is received.

Figure 4C:
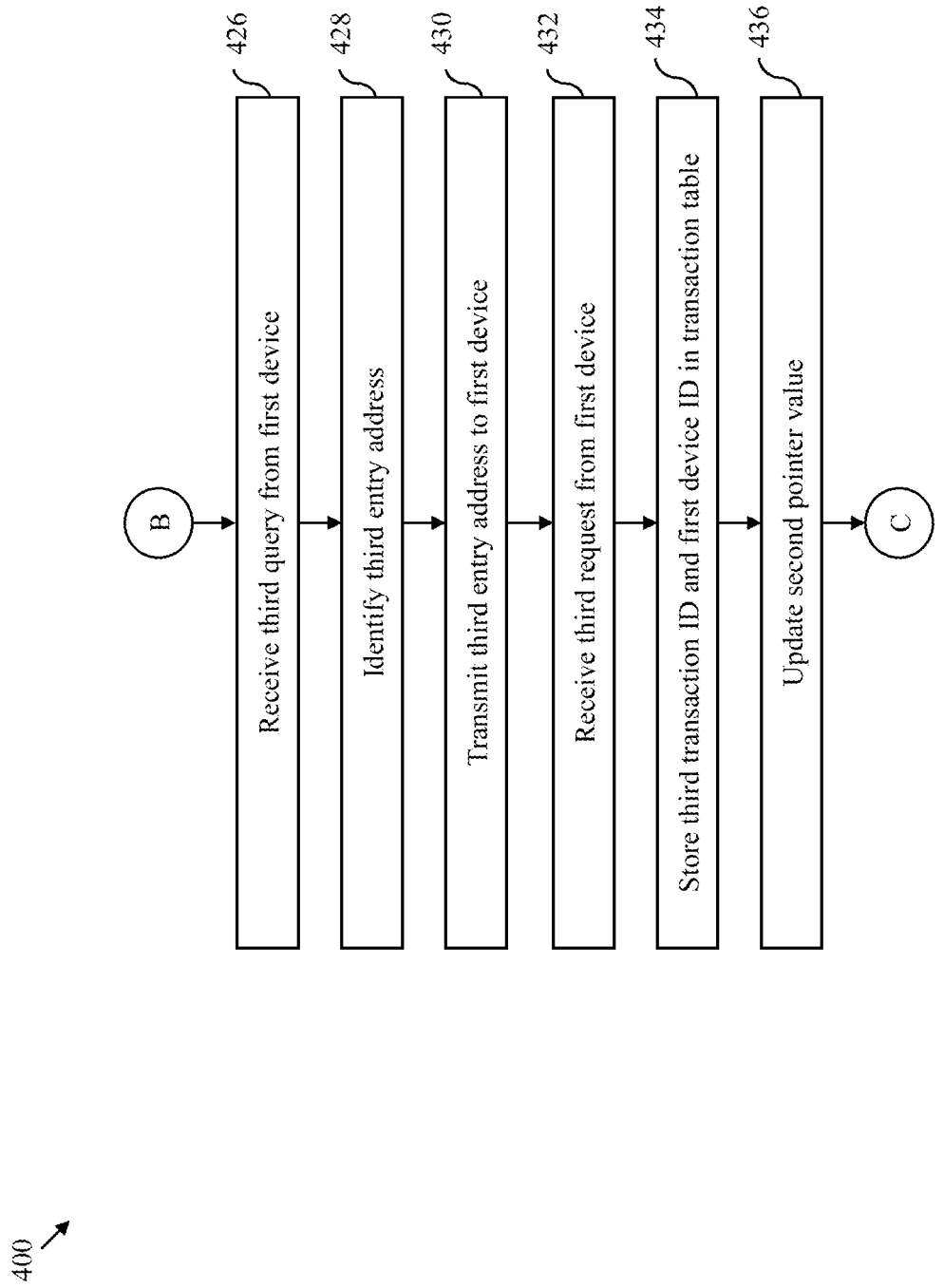

Referring now to FIG. 4C, at step 426, the ordering circuitry 114 receives the third query QU3 from the first device 102a. At step 428, the ordering circuitry 114 identifies the third entry address EA3 of the third entry 306 that is available. At step 430, the ordering circuitry 114 transmits the third entry address EA3 to the first device 102a as a response to the third query QU3. Based on the third entry address EA3, the first device 102a initiates the third transaction. The third transaction is initiated such that the third transaction has the third entry address EA3 as the third transaction ID TI3. Further, based on the initiation of the third transaction, the first device 102a generates the third request RQ3. At step 432, the ordering circuitry 114 receives the third request RQ3 from the first device 102a. At step 434, the ordering circuitry 114 stores the third transaction ID TI3 and the first device ID D1 in the transaction table 112. The ordering circuitry 114 stores the third transaction ID TI3 and the first device ID D1 in the third entry 306 of the transaction table 112. The ordering circuitry 114 further stores the third transaction ID TI3 in the second entry 304 of the transaction table 112 to indicate that the third transaction is initiated after the second transaction, and hence, is to be processed after the second transaction. At step 436, the ordering circuitry 114 updates the second pointer value from the second transaction ID TI2 to the third transaction ID TI3 when the third request RQ3 is received.

Figure 4D:
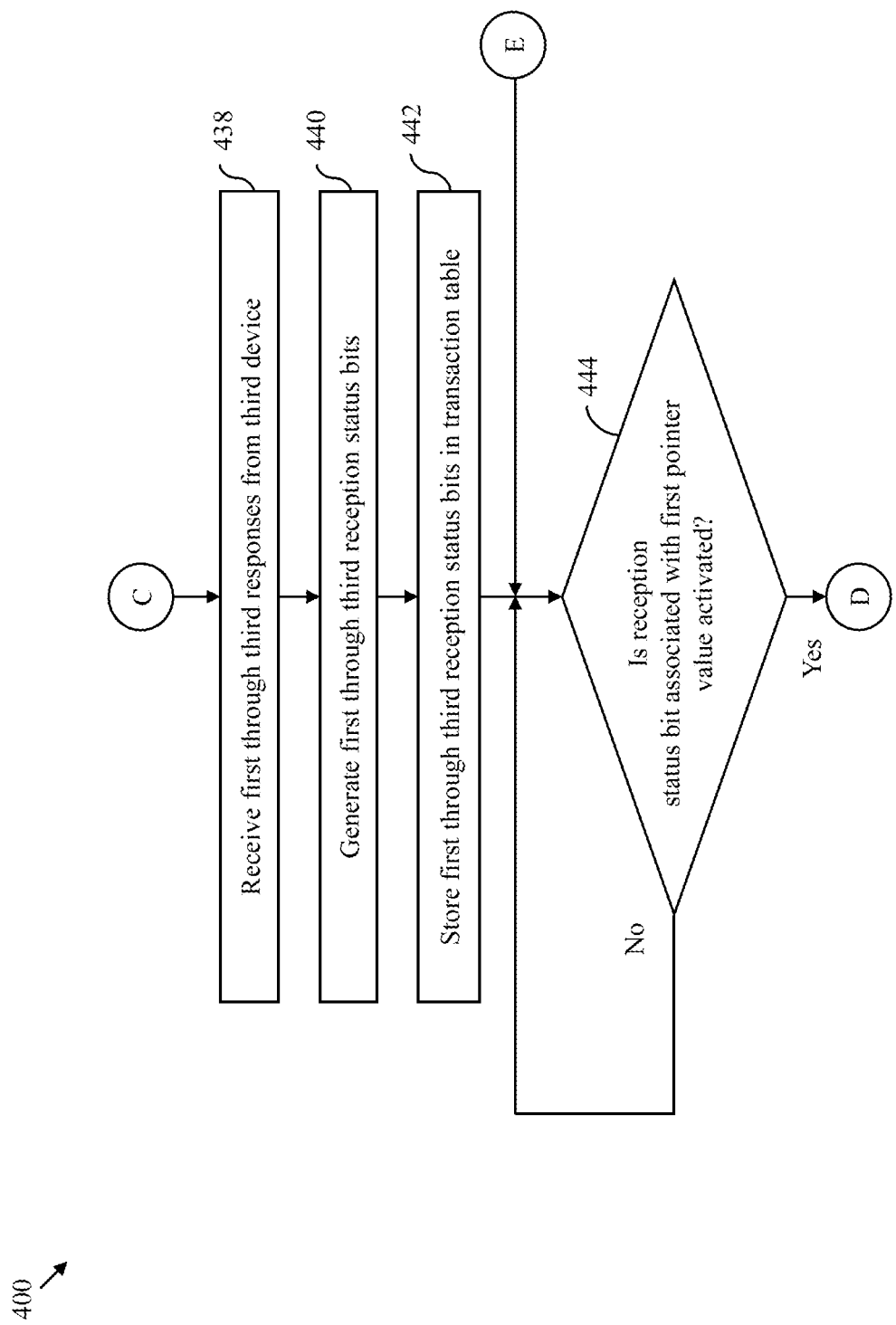

Referring now to FIG. 4D, at step 438, the ordering circuitry 114 receives the first through third responses RP1-RP3 from the third device 106 by way of the interconnect 104. The ordering circuitry 114 receives the first through third responses RP1-RP3 in one of a sequential manner and an out-of-order manner. For the sake of ongoing discussion, it is assumed that the ordering circuitry 114 receives the first through third responses RP1-RP3 in an out-of-order manner. At step 440, the ordering circuitry 114 generates the first through third reception status bits RS1-RS3 such that the first through third reception status bits RS1-RS3 are activated when the first through third responses are received, respectively. At step 442, the ordering circuitry 114 stores the first through third reception status bits RS1-RS3 in the first through third entries 302-306 of the transaction table 112 when the first through third response IDs RI1-RI3 are same as the first through third transaction IDs TI1-TI3, respectively. At step 444, the ordering circuitry 114 determines whether the reception status bit associated with the first pointer value is activated. If at step 444, it is determined that the reception status bit associated with the first pointer value is deactivated, step 444 is performed (i.e., the method is halted until the reception status bit associated with the first pointer value is activated). If at step 444, it is determined that the reception status bit associated with the first pointer value is activated, step 446 is performed.

Figure 4E:
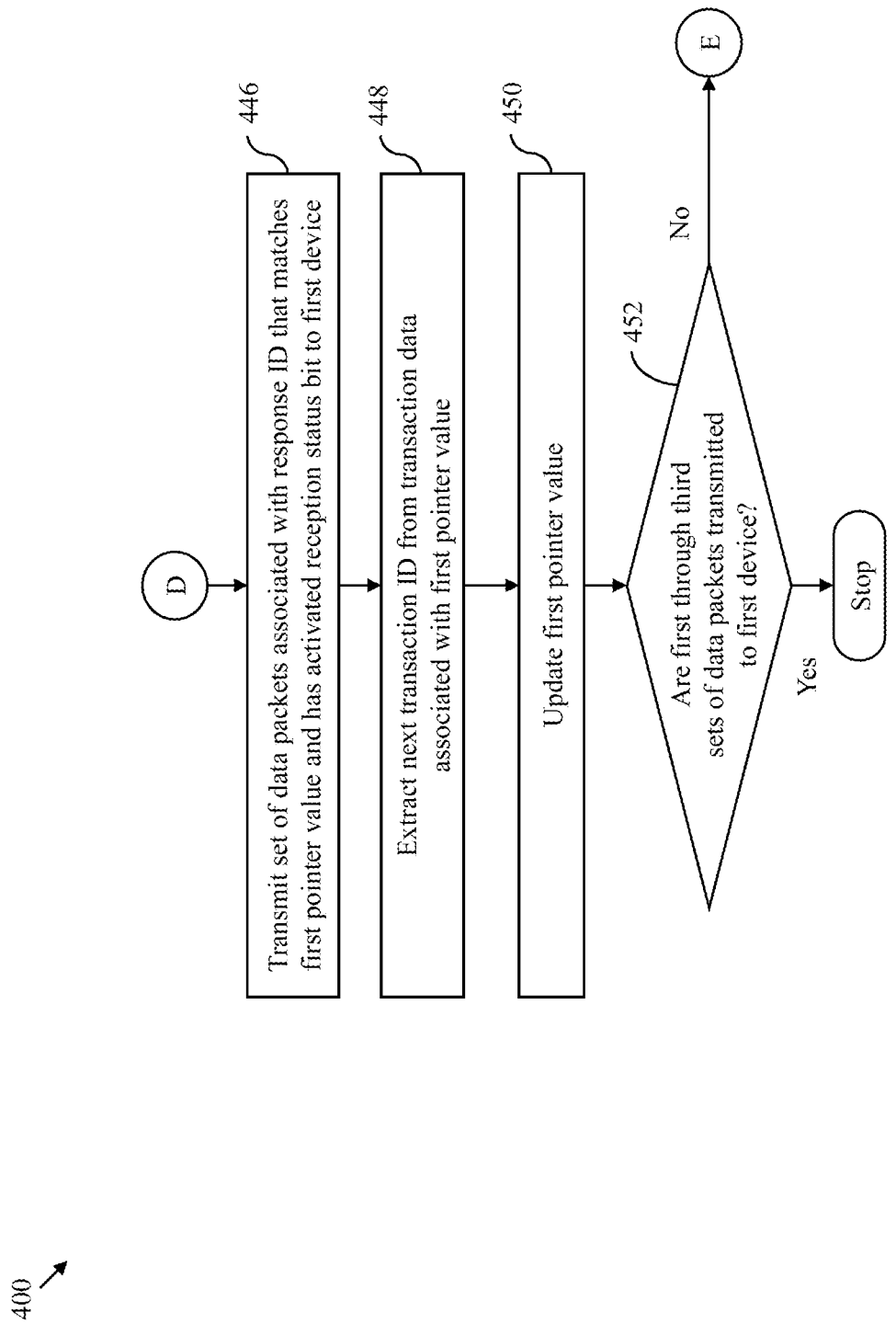

Referring now to FIG. 4E, at step 446, the ordering circuitry 114 transmits, to the first device 102a, the set of data packets associated with the response ID that matches the first pointer value and has the corresponding reception status bit activated. In an example, as the first pointer value is equal to the first transaction ID TI1, the ordering circuitry 114 transmits the first set of data packets DP1 to the first device 102a when the first reception status bit RS1 is activated. At step 448, the ordering circuitry 114 extracts a next transaction ID (e.g., the second transaction ID TI2) from transaction data associated with the first pointer value (e.g., the first transaction data). At step 450, the ordering circuitry 114 updates the first pointer value to the next transaction ID. For example, the ordering circuitry 114 updates the first pointer value from the first transaction ID TI1 to the second transaction ID TI2. At step 452, the ordering circuitry 114 determines whether the first through third sets of data packets DP1-DP3 are transmitted to the first device 102a. If at step 452, it is determined that the first through third sets of data packets DP1-DP3 are not transmitted to the first device 102a, steps 444-450 are performed. The ordering circuitry 114 thus orders the first through third transactions. It will be apparent to a person skilled in the art that the transaction ordering system 108 may order transactions initiated by the second device 102b in a similar manner as described in the flow chart 400.

Thus, in the transaction ordering system 108 of the present disclosure, entry addresses (such as the first through sixth entry addresses EA1-EA6) of the transaction table 112 are utilized as transaction IDs of various transactions (such as the first through sixth transactions). Further, each transaction data of the transaction table 112 includes a transaction ID of a transaction that is to be subsequently processed. As a result, a need to implement various comparison circuits in the transaction ordering system 108 of the present disclosure to order various transactions is eliminated. Consequently, a size and a manufacturing cost of the transaction ordering system 108 of the present disclosure are significantly less than that of a conventional transaction ordering system that utilizes counters for ordering transactions and implements various comparison circuits. Thus, a size and a manufacturing cost of the SoC 100 that includes the transaction ordering system 108 of the present disclosure are significantly less than that of an SoC that includes the conventional transaction ordering system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A transaction ordering system for ordering a plurality of transactions that are initiated by a first device for executing the plurality of transactions with a second device, the transaction ordering system comprising:
   ordering circuitry that is coupled with the first and second devices, wherein the ordering circuitry is configured to:
      generate first and second pointer values associated with the first device such that when a first transaction of the plurality of transactions is initiated, each pointer value of the first and second pointer values is equal to a first transaction identifier (ID) of the first transaction;
      update the second pointer value from the first transaction ID to a second transaction ID of a second transaction, in response to an initiation of the second transaction of the plurality of transactions, the second transaction being initiated after the first transaction;
      receive, from the second device, first and second responses associated with the first and second transactions, respectively, wherein the first and second responses include first and second response IDs and first and second sets of data packets, respectively, wherein the first response is received after the second response; and
      reorder, based on the first and second response IDs and the first and second pointer values, transmission of the first and second sets of data packets to the first device such that the second set of data packets is transmitted to the first device after the first set of data packets is transmitted,
   wherein a value of the first transaction ID and the first response ID are equal to a value of a first entry address of first entry of a transaction table, the first entry comprising first transaction data of the first transaction and the first transaction data is stored at the first entry address, wherein a value of the second transaction ID and the second response ID are equal to a value of a second entry address of a second entry of the transaction table, the second entry comprising second transaction data of the second transaction and the second transaction data is stored at the second entry address, wherein the first pointer value and the second pointer value are equal to a respective transaction ID value and the transmission ordering is exclusively specified by the value of the second entry address located in the first transaction data.

2. The transaction ordering system of claim 1, further comprising a storage circuit that is configured to store the transaction table that includes a plurality of entries associated with the plurality of transactions, wherein:
   the first and second transaction data associated with the first and second transactions are stored in first and second entries of the plurality of entries, respectively,
   the first and second transaction IDs correspond to the first and second entry addresses of the first and second entries, respectively,
   the first transaction data includes the first and second transaction IDs and a device ID of the first device, and
   the second transaction ID in the first transaction data indicates that the second transaction is initiated after the first transaction.

3. The transaction ordering system of claim 2, wherein when the first set of data packets is transmitted to the first device, the ordering circuitry is further configured to extract the second transaction ID from the first transaction data, and update the first pointer value from the first transaction ID to the second transaction ID.

4. The transaction ordering system of claim 2, wherein the second transaction data includes the second transaction ID, the device ID of the first device, and a third transaction ID of a third transaction of the plurality of transactions that is initiated after the second transaction.

5. The transaction ordering system of claim 4, wherein the ordering circuitry includes a processing circuit that is coupled with the storage circuit and the first device, wherein when the first transaction is initiated, the processing circuit is configured to (i) receive, from the first device, the first transaction ID and the device ID of the first device, (ii) store the first transaction ID and the device ID in the first entry of the transaction table, and (iii) generate the first and second pointer values such that each pointer value of the first and second pointer values is equal to the first transaction ID, and wherein when the second transaction is initiated, the processing circuit is further configured to (i) receive, from the first device, the second transaction ID and the device ID of the first device, (ii) store the second transaction ID in the first and second entries of the transaction table and the device ID in the second entry of the transaction table, and (iii) update the second pointer value from the first transaction ID to the second transaction ID.

6. The transaction ordering system of claim 2, wherein the ordering circuitry includes a buffer memory, a processing circuit, and a response control circuit that is coupled with the second device, the processing circuit, and the buffer memory, and wherein the response control circuit is configured to:
   receive the first and second responses from the second device;
   store the first and second sets of data packets in the buffer memory; and
   transmit the first and second response IDs to the processing circuit.

7. The transaction ordering system of claim 6, wherein the processing circuit is coupled with the storage circuit, and wherein the processing circuit is configured to:
   generate first and second reception status bits such that the first and second reception status bits are activated when the first and second response IDs are received by the processing circuit, respectively;
   determine whether the first and second response IDs match the first and second transaction IDs, respectively; and
   store, when the first and second response IDs match the first and second transaction IDs, the first and second reception status bits in the first and second entries of the transaction table, respectively.

8. The transaction ordering system of claim 7, wherein the ordering circuitry further includes a first-in-first-out (FIFO) memory and a FIFO control circuit that is coupled with the FIFO memory, the buffer memory, and the processing circuit, and wherein the FIFO control circuit is configured to:
receive the first response ID from the processing circuit when the first reception status bit associated with the first pointer value is activated;
store the first response ID in the FIFO memory; and
retrieve the first response ID from the FIFO memory when the first response ID is at a first location of the FIFO memory.

9. The transaction ordering system of claim 8, wherein the processing circuit is further configured to:
determine whether the first reception status bit associated with the first pointer value is activated; and
transmit the first response ID to the FIFO control circuit when the first reception status bit associated with the first pointer value is activated.

10. The transaction ordering system of claim 8, wherein the FIFO control circuit is further configured to determine whether a count associated with the first device is less than a threshold value, and re-store the first response ID in the FIFO memory when the count associated with the first device is equal to the threshold value.

11. The transaction ordering system of claim 8, wherein:
the FIFO control circuit is further configured to (i) determine whether a count associated with the first device is less than a threshold value, (ii) generate, when the count associated with the first device is less than the threshold value, first transmission status data based on the first response ID, and (iii) transmit the first transmission status data to the buffer memory, and
the buffer memory is configured to transmit, based on the first transmission status data, the first set of data packets to the first device.

12. The transaction ordering system of claim 11, wherein the ordering circuitry further includes a counter that is coupled with the FIFO control circuit, and configured to generate and transmit the count associated with the first device to the FIFO control circuit, and wherein the count is incremented when the first set of data packets is transmitted to the first device.

13. The transaction ordering system of claim 11, wherein the processing circuit is further configured to:
extract, when the first set of data packets is transmitted to the first device, the second transaction ID from the first transaction data;
update the first pointer value from the first transaction ID to the second transaction ID;
determine whether the second reception status bit associated with the first pointer value is activated; and
transmit, when the second reception status bit associated with the first pointer value is activated, the second response ID to the FIFO control circuit to facilitate transmission of the second set of data packets to the first device.

14. The transaction ordering system of claim 1, wherein the ordering circuitry is further configured to:
create, for the first transaction, a first entry in the transaction table, the first entry being identified by the first transaction ID in the first entry and having the first transaction data which includes the first transaction ID; and
update the first transaction data of the first entry to include the second transaction ID of the second transaction;
wherein when the first set of data packets is transmitted to the first device, the ordering circuitry is further configured to extract the second transaction ID from the first transaction data of the first entry, and update the first pointer value from the first transaction ID to the second transaction ID which indicates another entry of the table, the other entry being identified by the second transaction ID and having the second transaction data.

15. The transaction ordering system of claim 1, wherein the first transaction data in the first address entry of the table consists of the first transaction ID, a device ID of the first device, the second transaction ID, and a reception status bit, the status bit being activated when the first response ID is received by the processing circuit.

16. A system-on-chip (SoC), comprising:
first and second devices, wherein the first device is configured to initiate a plurality of transactions for executing the plurality of transactions with the second device; and
a transaction ordering system that is coupled with the first and second devices, and configured to order the plurality of transactions, the transaction ordering system comprising:
ordering circuitry that is coupled with the first and second devices, wherein the ordering circuitry is configured to:
generate first and second pointer values associated with the first device such that when a first transaction of the plurality of transactions is initiated, each pointer value of the first and second pointer values is equal to a first transaction identifier (ID) of the first transaction;
update the second pointer value from the first transaction ID to a second transaction ID of a second transaction, in response to an initiation of the second transaction of the plurality of transactions, the second transaction being initiated after the first transaction;
receive, from the second device, first and second responses associated with the first and second transactions, respectively, wherein the first and second responses include first and second response IDs and first and second sets of data packets, respectively, wherein the first response is received after the second response; and
reorder, based on the first and second response IDs and the first and second pointer values, transmission of the first and second sets of data packets to the first device such that the second set of data packets is transmitted to the first device after the first set of data packets is transmitted;
wherein a value of the first transaction ID and the first response ID are equal to a value of a first entry address of first entry of a transaction table, the first entry comprising first transaction data of the first transaction and the first transaction data is stored at the first entry address, wherein a value of the second transaction ID and the second response ID are equal to a value of a second entry address of a second entry of the transaction table, the second entry comprising second transaction data of the second transaction and the second transaction data is stored at the second entry address, wherein the first pointer value and the second pointer value are equal to a respective transaction ID value and the transmission ordering is exclusively specified by the value of the second entry address located in the first transaction data.

17. The SoC of claim 16, wherein:
the transaction ordering system further includes a storage circuit that is configured to store the transaction table that includes a plurality of entries associated with the plurality of transactions,
first and second transaction data associated with the first and second transactions are stored in first and second entries of the plurality of entries, respectively,
the first and second transaction IDs correspond to first and second entry addresses of the first and second entries, respectively,
the first transaction data includes the first and second transaction IDs and a device ID of the first device, and
the second transaction ID in the first transaction data indicates that the second transaction is initiated after the first transaction.

18. The SoC of claim 17, wherein when the first set of data packets is transmitted to the first device, the ordering circuitry is further configured to extract the second transaction ID from the first transaction data, and update the first pointer value from the first transaction ID to the second transaction ID.

19. The SoC of claim 17, wherein:
the second device is configured to generate the first and second responses,
the ordering circuitry includes a buffer memory, a processing circuit that is coupled with the storage circuit, and a response control circuit that is coupled with the second device, the processing circuit, and the buffer memory,
the response control circuit is configured to (i) receive the first and second responses from the second device, (ii) store the first and second sets of data packets in the buffer memory, and (iii) transmit the first and second response IDs to the processing circuit, and
the processing circuit is further configured to (i) generate first and second reception status bits such that the first and second reception status bits are activated when the first and second response IDs are received by the processing circuit, respectively, (ii) determine whether the first and second response IDs match the first and second transaction IDs, respectively, and (iii) store, when the first and second response IDs match the first and second transaction IDs, the first and second reception status bits in the first and second entries of the transaction table, respectively.

20. The SoC of claim 19, wherein:
the ordering circuitry further includes a first-in-first-out (FIFO) memory and a FIFO control circuit that is coupled with the FIFO memory, the buffer memory, and the processing circuit,
the FIFO control circuit is configured to (i) receive the first response ID from the processing circuit when the first reception status bit associated with the first pointer value is activated, (ii) store the first response ID in the FIFO memory, (iii) retrieve the first response ID from the FIFO memory when the first response ID is at a first location of the FIFO memory, (iv) determine whether a count associated with the first device is less than a threshold value, (v) generate, when the count associated with the first device is less than the threshold value, first transmission status data based on the first response ID, and (vi) transmit the first transmission status data to the buffer memory, and
the buffer memory is configured to transmit, based on the first transmission status data, the first set of data packets to the first device.

21. The SoC of claim 20, wherein the processing circuit is further configured to:
extract, when the first set of data packets is transmitted to the first device, the second transaction ID from the first transaction data;
update the first pointer value from the first transaction ID to the second transaction ID;
determine whether the second reception status bit associated with the first pointer value is activated; and
transmit, when the second reception status bit associated with the first pointer value is activated, the second response ID to the FIFO control circuit to facilitate transmission of the second set of data packets to the first device.

22. The SoC of claim 16, wherein the ordering circuitry is further configured to:
create, for the first transaction, a first entry in the transaction table, the first entry being identified by the first transaction ID in the first entry and having the first transaction data which includes the first transaction ID; and
update the first transaction data of the first entry to include the second transaction ID of the second transaction;
wherein when the first set of data packets is transmitted to the first device, the ordering circuitry is further configured to extract the second transaction ID from the first transaction data of the first entry, and update the first pointer value from the first transaction ID to the second transaction ID which indicates another entry of the table, the other entry being identified by the second transaction ID and having the second transaction data.

23. The SoC of claim 16, wherein the first transaction data in the first address entry of the table consists of the first transaction ID, a device ID of the first device, the second transaction ID, and a reception status bit, the status bit being activated when the first response ID is received by the processing circuit.

24. A method for ordering a plurality of transactions that are initiated by a first device for executing the plurality of transactions with a second device, the method comprising:
generating, by a transaction ordering system, first and second pointer values associated with the first device such that when a first transaction of the plurality of transactions is initiated, each pointer value of the first and second pointer values is equal to a first transaction identifier (ID) of the first transaction;
updating, by the transaction ordering system, the second pointer value from the first transaction ID to a second transaction ID of a second transaction, in response to an initiation of the second transaction of the plurality of transactions, the second transaction being initiated after the first transaction;
receiving, by the transaction ordering system from the second device, first and second responses associated with the first and second transactions, respectively, wherein the first and second responses include first and second response IDs and first and second sets of data packets, respectively, wherein the first response is received after the second response; and
reordering, by the transaction ordering system, based on the first and second response IDs and the first and second pointer values, transmission of the first and second sets of data packets to the first device such that the second set of data packets is transmitted to the first device after the first set of data packets is transmitted;

wherein a value of the first transaction ID and the first response ID are equal to a value of a first entry address of first entry of a transaction table, the first entry comprising first transaction data of the first transaction and the first transaction data is stored at the first entry address, wherein a value of the second transaction ID and the second response ID are equal to a value of a second entry address of a second entry of the transaction table, the second entry comprising second transaction data of the second transaction and the second transaction data is stored at the second entry address, wherein the first pointer value and the second pointer value are equal to a respective transaction ID value and the transmission ordering is exclusively specified by the value of the second entry address located in the first transaction data.

25. The method of claim 24, further comprising:

creating, for the first transaction, a first entry in the transaction table, the first entry being identified by the first transaction ID in the first entry and having the first transaction data which includes the first transaction ID; and updating the first transaction data of the first entry to include the second transaction ID of the second transaction;

wherein when the first set of data packets is transmitted to the first device, the ordering circuitry is further configured to extract the second transaction ID from the first transaction data of the first entry, and update the first pointer value from the first transaction ID to the second transaction ID which indicates another entry of the table, the other entry being identified by the second transaction ID and having the second transaction data.

26. The method of claim 24, wherein the first transaction data in the first address entry of the table consists of the first transaction ID, a device ID of the first device, the second transaction ID, and a reception status bit, the status bit being activated when the first response ID is received by the processing circuit.

* * * * *